(12) United States Patent
Pereira

(10) Patent No.: US 10,953,510 B2
(45) Date of Patent: Mar. 23, 2021

(54) METHOD FOR DETERMINING THE STATE OF WEAR OF A DRILL, AND CORRESPONDING DEVICE

(71) Applicant: SETI-TEC, Lognes (FR)

(72) Inventor: Sebastien Pereira, Charneca da Caparica (PT)

(73) Assignee: SETI-TEC, Lognes (FR)

( * ) Notice: Subject to any disclaimer, the term of this patent is extended or adjusted under 35 U.S.C. 154(b) by 0 days.

(21) Appl. No.: 16/071,748

(22) PCT Filed: Jan. 17, 2017

(86) PCT No.: PCT/EP2017/050900
§ 371 (c)(1),
(2) Date: Jul. 20, 2018

(87) PCT Pub. No.: WO2017/025392
PCT Pub. Date: Jul. 27, 2017

(65) Prior Publication Data
US 2019/0030673 A1     Jan. 31, 2019

(30) Foreign Application Priority Data
Jan. 20, 2016   (FR) ...................... 1650440

(51) Int. Cl.
*B23Q 17/09*   (2006.01)
*B23B 49/00*   (2006.01)
*G05B 19/4065* (2006.01)

(52) U.S. Cl.
CPC ........ *B23Q 17/0995* (2013.01); *B23B 49/001* (2013.01); *G05B 19/4065* (2013.01);
(Continued)

(58) Field of Classification Search
USPC ........................................................ 700/175
See application file for complete search history.

(56) References Cited

U.S. PATENT DOCUMENTS

| | | |
|---|---|---|
| 4,628,458 A | 12/1986 | Ohta et al. |
| 4,981,036 A * | 1/1991 | Curry ...................... E21B 44/00 175/50 |

(Continued)

FOREIGN PATENT DOCUMENTS

| | | |
|---|---|---|
| EP | 0339659 A2 | 11/1989 |
| EP | 1449615 A1 | 8/2004 |

(Continued)

OTHER PUBLICATIONS

French Search Report and Written Opinion dated Nov. 29, 2016 for corresponding French Application No. 1650440, filed Jan. 20, 2016.
(Continued)

*Primary Examiner* — Md Azad
(74) *Attorney, Agent, or Firm* — David D. Brush; Westman, Champlin & Koehler, P.A.

(57) ABSTRACT

A method is provided for assessing wear of a drill bit throughout its use for carrying out the drilling of elements to be drilled constituted by at least one layer and at least one material. The wear of the drill bit expresses its capacity to perform a drilling that meets at least one criterion of quality of a drilling. The method includes at least: measuring or detecting at least one parameter having an effect on the wear of the drill bit, the parameter being chosen from: the depth of drilling performed by the drill bit, and the entry of the drill bit into the element to be drilled; and determining at least one state of wear of the drill bit, each state of wear being determined as a function of one of the parameters and being characteristic of one of the criteria of quality of a drilling.

24 Claims, 10 Drawing Sheets

(52) U.S. Cl.
CPC .............. *G05B 2219/37251* (2013.01); *G05B 2219/37252* (2013.01); *G05B 2219/37258* (2013.01)

(56) References Cited

U.S. PATENT DOCUMENTS

| | | | | |
|---|---|---|---|---|
| 5,689,062 | A * | 11/1997 | Jawahir | .................... G01N 3/58 700/175 |
| 5,780,725 | A | 7/1998 | Tanaka | |
| 7,523,678 | B2 * | 4/2009 | Turrini | ............... G05B 19/4065 702/9 |
| 2003/0182014 | A1 | 9/2003 | McDonnell et al. | |
| 2008/0161959 | A1 * | 7/2008 | Jerard | ................ G05B 19/4065 700/110 |
| 2014/0193217 | A1 | 7/2014 | Pereira | |

FOREIGN PATENT DOCUMENTS

| | | | |
|---|---|---|---|
| FR | 2548070 | A1 | 1/1985 |
| FR | 3000693 | A1 | 7/2014 |

OTHER PUBLICATIONS

International Search Report dated Mar. 16, 2017 for corresponding International Application No. PCT/EP2017/050900, filed Jan. 17, 2017.
Written Opinion of the International Searching Authority dated Mar. 16, 2017 for corresponding International Application No. PCT/EP2017/050900, filed Jan. 17, 2017.

\* cited by examiner

| Data for assessment of the state of wear of a drill bit - Simplified procedure | | | | |
|---|---|---|---|---|
| | Data predefined for a given drill bit | | | State of wear |
| | Parameter | Material or group of materials | Max threshold | |
| Criterion of quality 1 | Depth drilled | Mat 1 | QP11max | |
| | | Mat 2 | QP12max | |
| | | Mat 3 | QP13max | |
| | Number of entries | Mat 1 | QN11max | |
| | | Mat 2 | QN12max | |
| | | Mat 3 | QN13max | |
| Criterion of quality 2 | Depth drilled | Mat 1 | QP21max | |
| | | Mat 2 | QP22max | |
| | | Mat 3 | QP23max | |
| | Number of entries | Mat 1 | QN21max | |
| | | Mat 2 | QN22max | |
| | | Mat 3 | QN23max | |
| Criterion of quality 3 | Depth drilled | Mat 1 | QP31max | |
| | | Mat 2 | QP32max | |
| | | Mat 3 | QP33max | |
| | Number of entries | Mat 1 | QN31max | |
| | | Mat 2 | QN32max | |
| | | Mat 3 | QN33max | |

Fig. 17

| Data for assessment of the state of wear of a drill bit - Dynamic procedure ||||||
| Data predefined for a given drill bit ||||| State of wear |
| Criterion of quality | Parameter | Material | Polynomial function | Inverse polynomial function | Max threshold |
| --- | --- | --- | --- | --- | --- |
| Criterion of quality 1 | Depth drilled | Mat 1 | G(p) | InvG(e) | QP1max |
| | | Mat 2 | H(p) | InvH(e) | |
| | | Mat 3 | I(p) | InvI(e) | |
| | Number of entries | Mat 1 | J(n) | InvJ(e) | QN1max |
| | | Mat 2 | K(n) | InvK(e) | |
| | | Mat 3 | L(n) | InvL(e) | |
| Criterion of quality 2 | Depth drilled | Mat 1 | M(p) | InvM(e) | QP2max |
| | | Mat 2 | N(p) | InvN(e) | |
| | | Mat 3 | O(p) | InvO(e) | |
| | Number of entries | Mat 1 | P(n) | InvP(e) | QN2max |
| | | Mat 2 | Q(n) | InvQ(e) | |
| | | Mat 3 | R(n) | InvR(e) | |
| Criterion of quality 3 | Depth drilled | Mat 1 | S(p) | InvS(e) | QP3max |
| | | Mat 2 | T(p) | InvT(e) | |
| | | Mat 3 | U(p) | InvU(e) | |
| | Number of entries | Mat 1 | V(n) | InvV(e) | QN3max |
| | | Mat 2 | W(n) | InvW(e) | |
| | | Mat 3 | X(n) | InvX(e) | |

Fig. 18

METHOD FOR DETERMINING THE STATE OF WEAR OF A DRILL, AND CORRESPONDING DEVICE

1. CROSS-REFERENCE TO RELATED APPLICATIONS

This Application is a Section 371 National Stage Application of International Application No. PCT/EP2017/050900, filed Jan. 17, 2017, the content of which is incorporated herein by reference in its entirety, and published as WO 2017/125392 on Jul. 27, 2017, not in English.

2. FIELD OF THE INVENTION

The field of the invention is that of techniques for the drilling of elements to be drilled and that of controlling or checking wear in cutting tools implemented for this purpose.

The invention especially relates to methods and devices for controlling or checking the wear of drill bits.

3. PRIOR ART

Various drilling devices are commonly used in industry, for example in the aeronautics industry, to drill elements to be drilled.

These devices conventionally include an output shaft to which there is detachably attached a cutting tool such as a drill. These drilling devices include especially:
  Hand-held drills, during the use of which the thrust force on the drill bit is generated manually;
  drills during the use of which the forward feed of the drill bit is motor driven, the body of the drill being fixed to a support during drilling and being moved manually by an operator from one drilling point to another; these drills include:
    automatic feed drills for which the feed rate and the rotation frequency of the drill bit are dependent, and
    drills with controlled cutting parameters for which the feed rate and the rotation frequency of the drill bit can vary independently of each other;
  drilling robots which can be likened to machine tools which, when they are being used, can have the rotation frequency and feed rate or feed speed of the drill bit controlled independently of each another as in the case of drills of controlled cutting parameters.

The present invention is more particularly intended for use in the context of drills with controlled cutting parameters and drilling robots. Such drilling devices, also called drilling devices with controlled cutting parameters are connected to a control box containing especially the drilling program, i.e. all the information used for the automatic execution of a drilling strategy.

These drilling devices can be used to drill the element to be drilled made in one or more layers of different materials. These materials include especially aluminum alloys, titanium alloys, stratified carbon fiber, GLARE (Glass Laminate Aluminium Reinforced Epoxy), stainless steel, Iconel, etc.

Each of these materials is used especially because of its characteristics of mechanical, thermal or chemical resistance and strength and requires cutting parameters (especially cutting speeds and/or feed rates) such that they can be drilled in an optimal way. These materials can be associated in superimposed layers in which case the drill bit passes successively through different materials during a drilling operation.

During a drilling operation, forces are generated on the drill bit. This drill bit therefore tends to get worn out in the course of the drilling operations.

A drilling operation generally comprises:
  an entry into full material comprising a phase for centering the drill bit and a phase for stabilizing the drill bit during which the tip of the drill bit enters the material of the element to be drilled and the rotational axis of the drill bit becomes stable relative to the element to be drilled;
  a phase of drilling into full material that begins after the centering and stabilization of the drill bit when its cutting lips have penetrated the element to be drilled.

The wear of the drill bits is accentuated by their entry into full material during the centering and stabilizing phases.

The wear of the drill bits has an impact on the quality of the drilling operations performed when they are implemented.

The criteria of quality for a drilling comprise especially:
  the tolerance values on the diameter of the bore;
  the surface condition of the walls of the bore;
  the perpendicularity of the axis of the drillirelative to the wall to be drilled;
  the cylindricity of the bore;
  the location of the bore;
  the size of the burr formed on the element to be drilled following a drilling operation;
  delamination at the exit from a hole made through the carbon fiber.

Hence, the state of wear of the drill bits must be monitored in order to:
  prevent a worn-out drill bit from being used to carry out drilling operations: this leads to the performance of drilling operations that do not comply with the requisite quality criteria;
  prevent the premature replacement of a drill that is not yet worn out and could still be used to create quality bores: this leads to excessive consumption of drill bits and major tooling costs.

In order to check the state of wear of drill bits, there are known ways by which a pneumatic drill with controlled cutting parameters can be equipped with a cycle counter.

A cycle counter is used to count the number of starts of drilling cycles performed with a drill. Each drill bit is characterized by a limited number of drilling cycles beyond which it must be replaced. Since it is known that one and the same drill bit can be used to carry out drilling cycles that are different, especially in terms of the material drilled, the borderline number of cycles is predetermined experimentally by taking account of the most difficult conditions of use that will be encountered by the drill bit during its use. To this end, using a drill bit, successive bores are made in the laboratory into that material which is most difficult to drill among those materials that it will have to drill.

Following each drilling operation, a check is performed on:
  the criteria representing the quality of the bore hole (geometrical and dimensional tolerance values);
  the deterioration of the sharpness of the cutting edge of the drill bit;
  the wear of the flank faces and the rake faces of the drill bit;
  the chipping of the cutting edge of the drill bit.

As soon as one of these parameters reflects the fact that the wear of the drill bit has reached a value beyond which the drill bit is considered to be worn out, the number of cycles performed with the drill bit to reach this level of wear is recorded as a borderline number of cycles.

In production, as soon as the number of drilling cycles performed with a drill bit reaches the borderline number of cycles of this drill bit, the drill bit is replaced.

This type of monitoring is not optimal.

Indeed, the structures to be drilled during production are complicated. They can for example be aircraft wings or other aircraft structures formed by the superimposition of layers of different materials. In order to optimize the structure of the aircraft and especially in order to reduce its weight, the materials used and their thicknesses vary from one place to another so as to further reinforce the structure at the places where the forces are at their highest and not oversize the structure at other places. As a result, it is impossible to have precise knowledge, at each drilling operation during production, of the exact nature, in terms of materials and thicknesses of layers, of the structure being drilled.

This complexity makes it impossible to carry out trials for qualifying a drill bit by carrying out laboratory drilling of samples that are identical, in terms of materials and thicknesses of layers, to the structures that will be drilled in production. On the contrary, the trials for qualifying a drill bit are carried out through drilling operations in which the most unfavorable case is selected as a reference. To this end, the drilling operations are done through plates of constant thickness with a given stack of materials corresponding to the most unfavorable case of drilling in production.

This leads to replacing the drill bits prematurely since not all the drilling operations carried out in production are the most unfavorable cases.

This type of monitoring too is not optimal because it especially does not consider the following:
the nature of the material or materials drilled and especially their abrasive effect;
the depth drilled;
the cutting speeds and feedrates;
the implementing or non-implementing of lubrication;
etc.

However, the wear capacity that each of the materials exerts on the drill bits is different. Each of the materials exerts torque forces on the drill bit during a drilling operation (torque along the rotational axis of the drill bit and/or longitudinal thrust along the rotational axis of the drill bit) and/or a different abrasive effect.

Titanium has a chipping effect on the tip and on the cutting lips of the drills. The drilling of a titanium element can therefore cause the tip of the drill bit used for this purpose to get chipped. The drilling of a hole with a drill bit having a damaged tip causes poor centering of the drill bit and can therefore lead to the creation of a poor-quality hole that does not comply with the requisite dimensional and geometrical tolerance values.

Carbon fiber is abrasive and tends to blunt the effect of the cutting lips of the drill bits.

Aluminum alloys can give rise to chips that adhere to the drill bit and/or wear out the coating of the drill bit.

Hence, making the replacement of drill bits conditional on the number of cycles during which it has been used and on the most difficult conditions of use, without taking account properly speaking of the wear capacity of the materials actually being drilled during these drilling cycles, does not provide for optimized management of the replacement of the drill bits. It leads on the contrary to replacing drill bits that have not yet been worn out. In addition, it can also happen that, inadvertently, drilling cycles are launched in untimely ways and are stopped even before the drill starts the corresponding drilling operation. The use of a cycle counter in this case would lead to the counting of the untimely cycles and thus to the premature replacement of the drill bits.

The arrival of electrical drills with controlled cutting parameters has enabled full control and real-time measurement of different parameters during a drilling operation, such as especially:
the rotation speed of the drill bit;
the feed rate of the drill bit;
the checking of lubrication, on/off switching and flow rate;
the detection of the entry and exit faces of the paths to be drilled;
the detection of changes of material;
the thrust force on the drill bit;
the drive torque on the drill bit.

It can thus be planned to assess the wear of a drill bit by measuring the forces to which it is subjected during its use.

However, certain materials can have different abrasive capacities without in any way causing different forces to be exerted on the drill bit when they are being drilled.

Taking account of the stresses exerted on a drill bit during a drilling operation is not enough to accurately assess the stresses on the drills and to deduce their level of wear from this.

There is therefore a need for a technique that optimizes the replacement of drill bits in order to reduce their consumption, i.e. a technique that leads to their replacement only when necessary.

4. SUMMARY

An exemplary embodiment of the invention proposes a method for assessing the wear of a drill bit throughout its use for carrying out the drilling of elements to be drilled constituted by at least one layer and at least one material, the wear of said drill bit expressing its capacity to perform a drilling that meets at least one criterion of quality of a drilling, said method comprising at least:
a step for measuring or detecting at least one parameter having an effect on the wear of said drill bit, said parameter being chosen from the group comprising:
the depth of drilling performed by said drill bit;
the entry of said drill bit into said element to be drilled;
a step for determining at least one state of wear of said drill bit, each state of wear being determined in accordance with one of said parameters and being characteristic of one of said criteria of quality of a drilling.

The invention therefore consists in determining at least one state of wear of a drill bit as a function of the drilling depth drilled by this bit and/or the number of entries of this bit into the material, each state of wear being characteristic of a criterion of quality of the drilling operation to be performed.

Thus, each drill bit possesses at least one state of wear corresponding to a criterion of quality of a drilling operation to be performed. It is thus possible, at each instant, to know the state of wear of a drill bit relative to a criterion of quality of a bore and thus to know the ability of the drill bit to carry out this drilling operation in meeting the criterion of quality in question.

The knowledge of this state or states of wear thus optimizes the management of the inventory of drill bits and ensures that high-quality drilling operations are carried out.

The state or states of wear are determined as a function of the depth drilled and/or the number of entries into the material by the drill bit. They are therefore more representative of the real level of wear of the drill bit, and this prevents it from being prematurely replaced.

According to one possible variant, each state of wear is associated with a predetermined maximum threshold, said maximum threshold of each of said states of wear being lower than or equal to a predetermined state of maximum wear beyond which the criterion of quality of which said state of wear is characteristic is no longer met.

The drill bit is then no longer usable once the maximum threshold for at least one state of wear is reached.

Thus, according to this aspect, the invention relies on an original approach that consists in determining at least one state of wear of a drill bit, characteristic of one of said criteria of quality of a drilling operation, as a function of the drilling depth made by this drill bit or the number of entries by this drill bit into an element to be drilled. In addition, each state of wear is associated with a predetermined maximum threshold, this maximum threshold being, for each state of wear, lower than or equal to a permissible borderline state of wear beyond which the criterion of quality of which said state of wear is characteristic is no longer met.

According to the prior art techniques, the borderline threshold of use of a drill bit corresponds to a number of typical drilling cycles, assumed to be representative of the drilling cycles really performed, beyond which the criteria of quality required for the bore hole are no longer met.

According to a different technique, the invention proposes to define the borderline threshold of use of a drill bit as a drilling depth or a maximum number of entries into an element to be drilled predetermined during trials and beyond which a criterion of quality (tolerance values for diameter, surface condition, etc.)
of the drilling operation is no longer met.

Thus, invention ensures the use of a drill bit so long as it is capable of carrying out quality drilling operations.

The technique according to the invention thus ensures:
the production of quality bores;
the optimizing of the consumption of drill bits inasmuch they are used so long as they are capable of producing quality bores.

In one possible variant, each state of wear is associated with a predetermined maximum threshold, said step for determining at least one state of wear of said drill bit comprising, during the performance, in production, of drilling operations in an element to be drilled using said drill bit, the qualification of said drill bit as:
a "serviceable drill bit" so long as said maximum threshold of said at least one state of wear of said drill bit is not reached;
a "drill bit out of service" from the instant when the maximum threshold of at least one state of wear of said drill bit is reached.

Thus, so long as the maximum threshold of at least one state of wear is not attained, the drill bit is qualified as being serviceable whereas once the maximum threshold of at least one state of wear is attained, the drill bit is qualified as being out of service.

According to one possible variant, a method according to the invention comprises a step for sending a message, for example a visual message and/or a sound message, indicating that the drill bit is out of service once the "out-of-service" qualification is assigned to the drill bit.

This makes it possible to provide a warning that the drill bit is no longer capable of carrying out a drilling operation that meets with the requisite criteria of quality. An operator could thus easily know the right time at which to replace a drill bit so as to use it for as long as it is still usable and to replace it only when it is no longer usable. The invention thus averts the deterioration of the quality of the drilling operations performed.

According to one possible variation, a method according to the invention comprises a step of preliminary laboratory assessment of at least one type of drill bit for at least one material or at least one group of given materials, said step of assessment comprising, for each type of drill bit and each material or group of materials:
the performance of at least one series of drilling operations in test specimens made out of said material or said group of materials with a new drill bit of the type considered at each of said series;
the verification, during each of these drilling operations, of compliance with said at least one criterion of quality;
the computation of a state of wear for said or each of said criteria of quality, as being a total of the parameter having an effect on the wear of said drill bit of the series considered;
the continuation of the drilling operations of said at least one series until said at least one criterion of quality is no longer met;
the recording, at each series, of a state of wear for said criterion of quality or each of said criteria of quality as a borderline permissible state of wear when the corresponding criterion of quality is no longer met;
when several series of drilling operations are performed, the computation, for said state or each of said states of wear, of the average of the borderlines permissible state of wear recorded during the series corresponding to the state of wear considered;
the determining of a maximum threshold of states of wear for said criterion of quality or said criteria of quality, said maximum threshold being equal to or lower than said permissible borderline or the average of the permissible borderlines of state of wear corresponding to a state of wear considered.

Such a preliminary laboratory assessment enables an efficient determination of the borderline thresholds of each state of wear.

According to one possible variant, each drill bit is associated with a memory, said preliminary step of assessment comprising a step for recording in the memory associated with each drill bit a maximum threshold for at least one state of wear proper to each material or group of materials, to a criterion of quality, and to a parameter having an effect on the wear.

According to one possible variant, a method according to the invention comprises, during the performance of drilling operations in production using said drill bit on elements to be drilled, made in a same given material or a same given group of materials, a step of recording, in the memory associated with said drill bit, at least one state of wear as being the totalized values of said corresponding parameter having an effect on the wear of said drill bit.

One or more states of wear can thus be determined from the total depth drilled by a drill bit and from the total number of entries into the material by a drill bit.

In one possible variant, the determining of at least one state of wear of said drill bit comprises a weighting as a function of the effect of abrasiveness of the material or materials drilled on the wear of the drill bit.

It is thus possible to take account of the abrasive effect of the materials drilled on the wear of a drill bit. This taking into account further optimizes the assessment of the wear of a drill bit.

According to one possible variant, in the context of said weighting operation of which:
- each state of wear is likened to a divergence from a desired value of said criterion of quality of the corresponding drilling;
- said divergence varies as a function of the totalized values of said corresponding parameter having an effect on the wear of said drill bit according to a predetermined function.

In this case, and according to a possible variant, a method according to the invention comprises a preliminary step of laboratory assessment of at least one type of drill bits for at least one material, said step of assessment comprising, for each type of drill bit and for each material:
- the performance of at least one series of drillings in test specimens made out of said material with a new drill bit of a considered type at each of said series;
- the measurement, after each of the drilling operations of said at least one series, of the divergence between the value of said criterion of quality or of each of said criteria of quality and said desired value corresponding to the criterion considered;
- the recording, for said criterion of quality or each of said criteria of quality, of the divergence between the value of the criterion of quality considered and said desired value as a function of the totalized values of the parameter having an effect on the wear of said drill bit corresponding to the criterion of quality considered;
- the continuation of drilling operations of said at least one series until said at least one criterion of quality is no longer met;
- when several series of drilling operations are performed, the computation for said criterion of quality or each of said criteria of quality of the average of said divergences as a function of the totalized values of the parameter having an effect on the wear of said drill bit corresponding to the criterion of quality considered;
- the computation, for said criterion of quality or each of said criteria of quality, of a polynomial regression of said divergence or of the average of the divergences as a function of the totalized values of the parameter having an effect on the wear of said drill bit corresponding to the criterion of quality considered, said polynomial regression constituting said predetermined function used in said weighting.

This implementation makes it possible to carry out an efficient weighting according to the abrasiveness of the materials.

According to one possible variant, a memory is associated with each drill bit, said step of assessment comprising a step for recording the following in the memory associated with each drill bit:
- the maximum threshold for at least one state of wear proper to a criterion of quality and to a parameter having an effect on the wear;
- at least one polynomial regression:
  - for a given material;
  - for a given criterion of quality;
  - for a parameter having an effect on the given wear.

According to one possible variant, a method according to the invention comprises, during the drilling of an element constituted by a stack of layers of different materials, a step for determining at least one state of wear of said drill bit as a function of the depth of drilling following the drilling of each of the said layers, the step for determining at least one state of wear of said drill bit proper to a criterion of quality following the drilling of a layer comprising, for each state of wear, the following steps:
- taking into account, at the start of the drilling of a given layer, of;
  - the state of wear computed following the drilling of the previous layer;
  - the polynomial regression corresponding to said drill bit, to the material of the given layer and to the criterion of quality to which the state of wear corresponds as a function of the depth drilled,
  - the inverse function of said polynomial regression, computation of a first value, which is the result of said inverse function applied to said state of wear computed following the drilling of the previous layer;
- taking account of the thickness drilled in said given layer,
- computation of a second value which is the sum of the first value and of said thickness drilled in said given layer,
- computation of the state of wear following drilling of said given layer, resulting from said polynomial regression applied to the second value.

It is thus possible to determine states of wear closer to reality in taking account of the abrasiveness of the materials drilled in the context of considering the depth of drilling.

According to one possible variant, a method according to the invention comprises successive steps for drilling elements to be drilled comprising at least one layer and at least one material, the material of an element to be drilled with which the drill bit initially comes into contact during a drilling step, constituting an attack material, said method comprising, in the course of each step for drilling an element to be drilled, a step for determining at least one state of wear of said drill bit proper to a criterion of quality as a function of the entry of said drill bit into the element to be drilled, the step for determining at least one state of wear of said drill bit comprising, for each state of wear, the following steps:
- taking account, during the detection of the entry of said drill bit into a given element to be drilled, of
  - the state of wear computed during the detection of the entry of said drill bit into the element to be drilled of the previous drilling step,
  - the polynomial regression corresponding to said drill bit, to the attack material of said given element to be drilled, and to the criterion of quality to which said state of wear corresponds as a function of the detection of the entry of said drill bit into an element to be drilled,
  - the inverse function of said polynomial regression,
- computing a first value resulting from said inverse function applied to said state of wear computed at the previous drilling step,
- computing a second value which is the sum of the first value and of the new entry,
- computing the state of wear following drilling of said given element to be drilled, resulting from said polynomial regression applied to the second value.

It is thus possible to determine states of wear closer to reality by taking account of the abrasiveness of the materials drilled in the context of taking account of the number of entries into the material by a drill bit.

According to one possible variant, a method according to the invention furthermore comprises a step for the recording, in the memory associated with each drill bit during its use to drill the elements to be drilled, of at least one state of wear.

According to one possible variant, said at least one criterion of quality of a drilling belongs to the group comprising:
- the tolerance values on the diameter of the bore;
- the surface condition of the bore walls;
- the perpendicularity of the axis of the drilling relative to the wall to be drilled;
- the cylindricity of the bore;
- the location of the bore;
- the size of the burr formed on the element to be drilled following a drilling operation;
- the delamination at the exit from a hole made through the carbon fiber.

The present invention also relates to a device for assessing the wear of a drill bit throughout its use in order to carry out the drilling of elements to be drilled constituted by at least one layer and at least one material, the wear of said drill bit expressing its capacity to carry out a drilling meeting at least one criterion of quality of a drilling, said device comprising at least:
- means for measuring or detecting at least one parameter having an effect on the wear of said drill bit, said parameter being chosen from the group comprising:
  - the drilling depth drilled by said drill bit;
  - the entry of said drill bit into the element to be drilled;
- means for determining at least one state of wear of said drill bit, each state of wear being determined as a function of one of said parameters and being characteristic by one of said criteria of quality of a drilling operation.

According to one possible variant, each state of wear is associated with a predetermined maximum threshold, said maximum threshold of each of said states of wear being lower than or equal to a predetermined state of maximum wear beyond which the criterion of quality of which said state of wear is characteristic is no longer met.

According to one possible variant, a device according to the invention comprises means for qualifying said drill bit as:
- a "serviceable drill bit" that is serviceable so long as said maximum threshold of said at least one state of wear of said drill bit is not reached;
- an "out-of-service drill bit" that is out of service starting from the instant when the maximum threshold of at least one state of wear of said drill bit is reached.

According to one possible variant, a device according to the invention comprises means for sending out a message indicating that the drill bit is out of service as soon as the "out-of-service" qualification is assigned to the drill bit.

According to one possible variant, each drill bit is associated with a memory containing:
- at least one material or at least one group of materials;
- a maximum threshold for each state of wear proper to each material or group of materials, to each parameter having an effect on the wear and to each criterion of quality;
- at least one state of wear.

According to one possible variant, a device according to the invention comprises means for the recording, in the memory associated with said drill bit, during the performance, in production, of drilling operations using said drill bit in elements to be drilled made out of a same given material or a same given group of materials, of at least one state of wear as the totalized values of said corresponding parameter having an effect on the wear of said drill bit.

According to one possible variant, said means for determining at least one state of wear of said drill bit carry out a weighting as a function of the effect of the abrasiveness of the drilled material or materials on the wear of the drill bit.

According to one possible variant, in the context of said weighting where:
- each state of wear is likened to a divergence relative to a desired value of said criterion of quality of the corresponding drilling operation;
- said divergence varies as a function of the totalized values of said corresponding parameter having an effect on the wear of said drill bit according to a predetermined function.

According to one possible variant, a device according to the invention comprises means for determining at least one state of wear of said drill bit as a function of the depth of drilling following the drilling of each of said layers of different materials of which an element to be drilled is constituted, said means for determining at least one state of wear of said drill bit following the drilling of a layer comprising, for each state of wear:
- means for taking the following into account at the beginning of the drilling of a given layer:
  - the state of wear computed following the drilling of the previous layer;
  - a predetermined polynomial regression of the divergence between said criterion of quality, to which the state of wear corresponds, and a desired value as a function of the totalized values of the depth of drilling by said drill bit, said polynomial regression corresponding to said drill bit, to said material of the given layer;
  - the inverse function of said polynomial regression;
- means for computing a first value, resulting from said inverse function applied to said state of wear computed following the drilling of the previous layer;
- means for taking account of the thickness drilled into said given layer, means for computing a second value, which is the sum of the first value and of said thickness drilled in said given layer,
- means for computing the state of wear at the end of drilling of said given layer, resulting from said polynomial regression applied to the second value.

According to one possible variant, a device according to the invention comprises means for determining at least one state of wear of said drill bit as a function of the entry of said drill bit into an element to be drilled at each drilling of an element to be drilled comprising at least one layer and at least one material, the material of an element to be drilled with which the drill bit first comes into contact during a drilling step constituting an attack material, said means for determining at least one state of wear of said drill bit comprising, for each state of wear:
- means for taking account of the following during the detection of the entry of said drill bit into a given element to be drilled:
  - the state of wear computed during the detection of the entry of said drill bit into the element to be drilled of the previous drilling step,
  - a predetermined polynomial regression of the divergence between said criterion of quality, to which the state of wear corresponds, and a desired value as a function of the totalized values of detection of the entry of said drill bit into an element to be drilled, corresponding to said drill bit, to said attack material of said given element to be drilled,
  - the inverse function of said polynomial regression, means for computing a first value, resulting from said inverse function applied to said state of wear computed at the preceding drilling step;

means for computing a second value, which is the sum of the first value and of the new entry, means for computing the state of wear of the end of drilling of said given element to be drilled, resulting from said polynomial regression applied to the second value.

According to one possible variant, a device according to the invention comprises a memory associated with each drill bit containing:

a maximum threshold of at least one state of wear;
at least one polynomial regression;
   for a given material;
   for a given criterion of quality;
   for a parameter having an effect on the given wear;
at least one state of wear.

According to one possible variant, said at least one criterion of quality of a drilling operation belongs to the group comprising:

the tolerance values on the diameter of the bore;
the surface condition of the bore walls.
the perpendicularity of the axis of the drilling relative to the wall to be drilled;
the cylindricity of the drilling;
the location of the drilling;
the size of the burr formed on the element to be drilled following a drilling operation;
the delamination at the exit from a hole made through the carbon fiber.

In one variant, a device for assessment according to the invention can be integrated into a drilling device, especially a drilling device with controlled cutting parameters.

5. LIST OF FIGURES

Other features and advantages of the invention shall appear from the following description of particular embodiments given by way of a simple illustrative and non-exhaustive example and from the appended drawings, of which:

FIGS. 17 and 18 illustrate examples of tables of data collected after the laboratory assessments of the progress of the state of wear of a typical drill bit according to the simplified and dynamic procedures.

6. DESCRIPTION OF PARTICULAR EMBODIMENTS

6.1. Device

A drilling device or drill to implement a method according to the invention comprises a drill or a drilling robot with controlled cutting parameters. Such a drilling device is known per se to those skilled in the art and is not described in detail herein apart from the elements more specific to the invention.

Figure 1A:
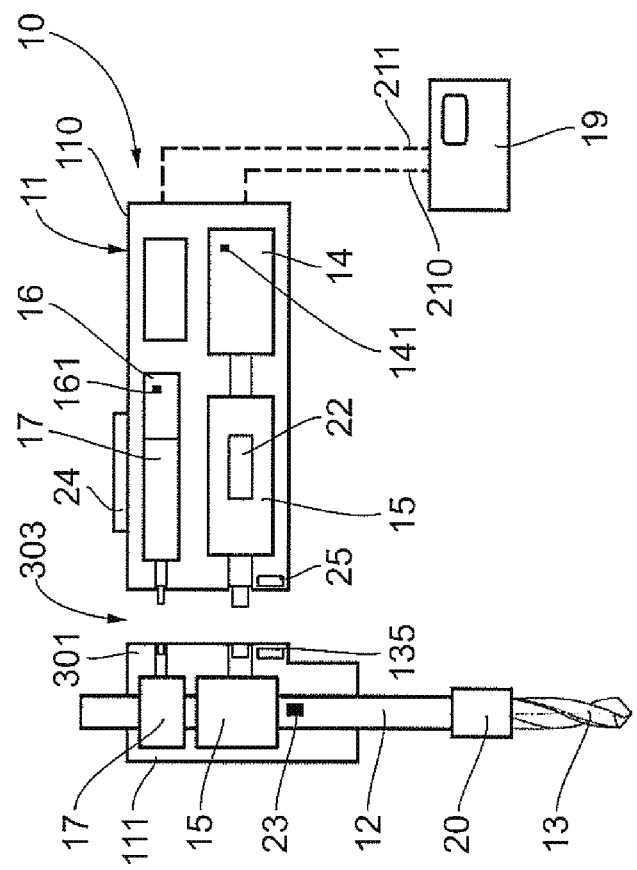
FIGS. 1a and 1b illustrate drawings of a drilling device according to the invention, respectively with its removable head fixedly attached to the body and detached from the body.
Figure 1B:
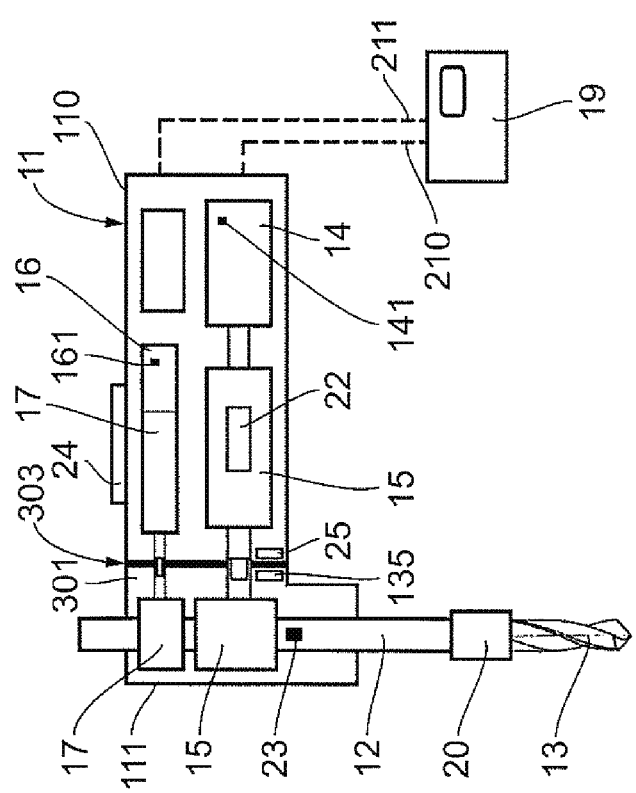
Figure 3:
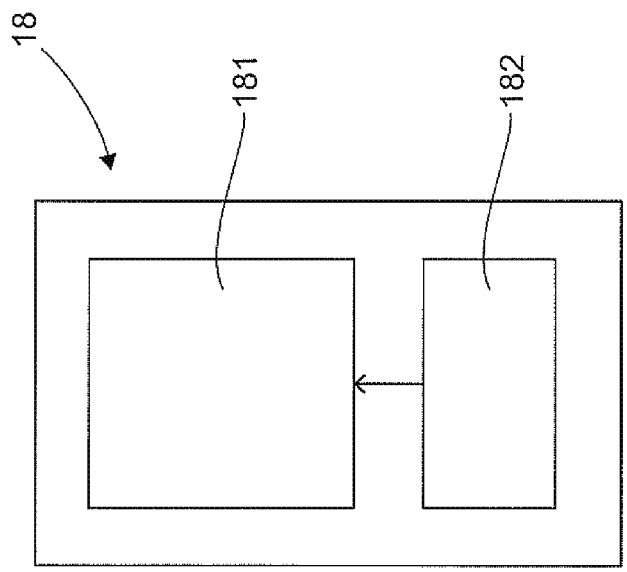
FIG. 3 illustrates the controller of the device of FIGS. 1a and 1b.
Figure 2:
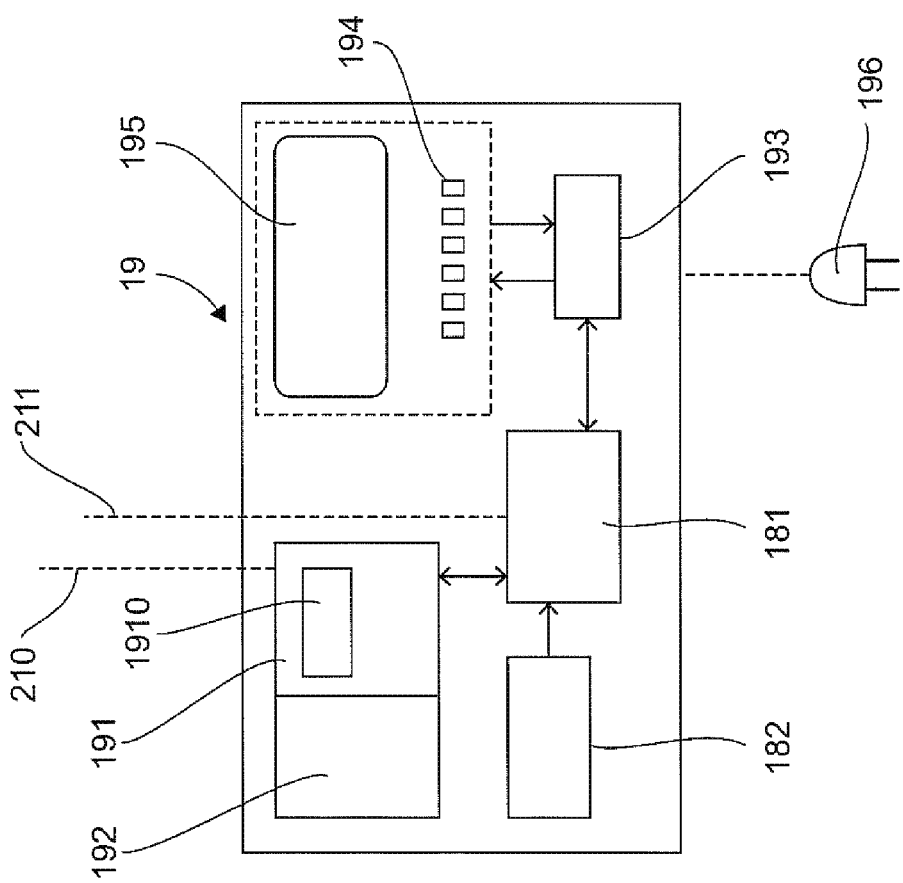
FIG. 2 illustrates a drawing of control means for the device of FIGS. 1a and 1b.

As can be seen in FIGS. 1a and 1b, such a drilling device 10 comprises a casing 11.

The casing 11 comprises a first casing portion 110 and a second casing portion 111 that extend appreciably perpendicularly to one another. In one variant, the casing could extend along a single axis and thus not have an essentially T shape.

The drill comprises an output shaft 12 that is mobile in rotation and in translation along a same axis. This output shaft 12 is connected by means of one or more transmission chains to driving means.

In this embodiment, the driving means comprises:

An electric rotational drive means 14 linked to the output shaft 12 by a transmission chain 15 enabling the rotational driving of the output shaft 12 and therefore of the drill bit 13 that is fixedly attached thereto, and an electric feed motor 16 linked to the output shaft 12 by a transmission chain 17 enabling the driving in translation of the output shaft 12 and therefore of the drill bit that is fixedly attached thereto.

The driving in rotation and in translation are achieved along a same axis. Such a principle is described especially in the document FR3000693.

The drilling device comprises a removable drilling head 301. This drilling head corresponds to the second casing portion 111 and comprises means 20 for the fixed attachment of a drill bit 13. Reversible mechanical and electrical linking means 303 will be classically used between the removable drilling head 301 and the first casing portion 110 (i.e. the body of the drill).x This head comprises a memory 135 such as for example an RFID chip or any other appropriate data storage means. The first casing portion 110 will therefore comprise a reader 25 capable of reading the information contained in the memory associated with the drill head 301.

The load in air on the drill bit of a drilling device results essentially from the frictional forces that occur within the removable drill head.

The head comprises means 20 for the fixed attachment of a cutting tool 13, for example a drill bit, placed at the extremity of the output shaft 12. These fixed attachment means can for example comprise a drill bit clamp. Clearly, these fixed attachment means can enable the fixed attachment of a plurality of different drill bits to the drill.

During the service life of the drill bit, pieces of information on the drill bit are carried by the memory integrated into the head.

In one variant, it can be planned to integrate the memory directly into the drill bit.

In both these variants, it will be said that the memories are associated with the drill bit, whether it is integrated into its tool-holder or directly into the drill bit.

One alternative to an RFID label could be an electronic memory connected to the controller of the drill bit by electric connectors.

Figure 4A:
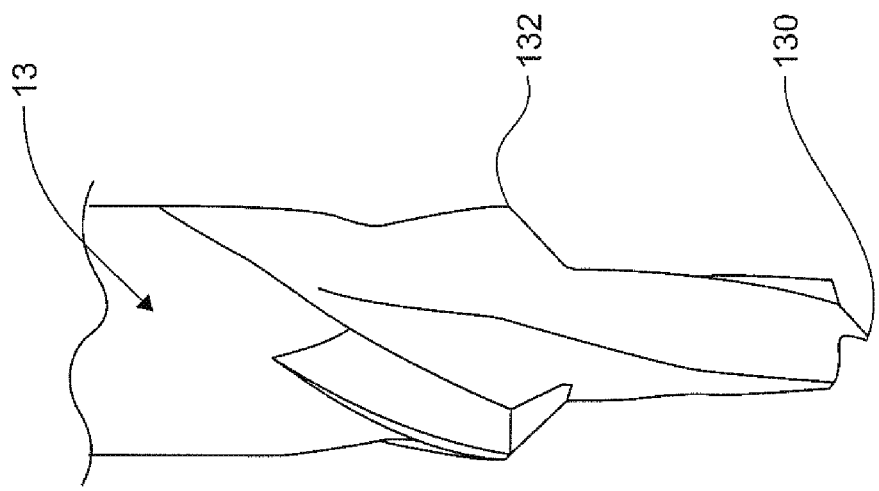
FIG. 4a illustrates the extremity of a drill bit and FIG. 4b illustrates a step drill bit.
Figure 4B:
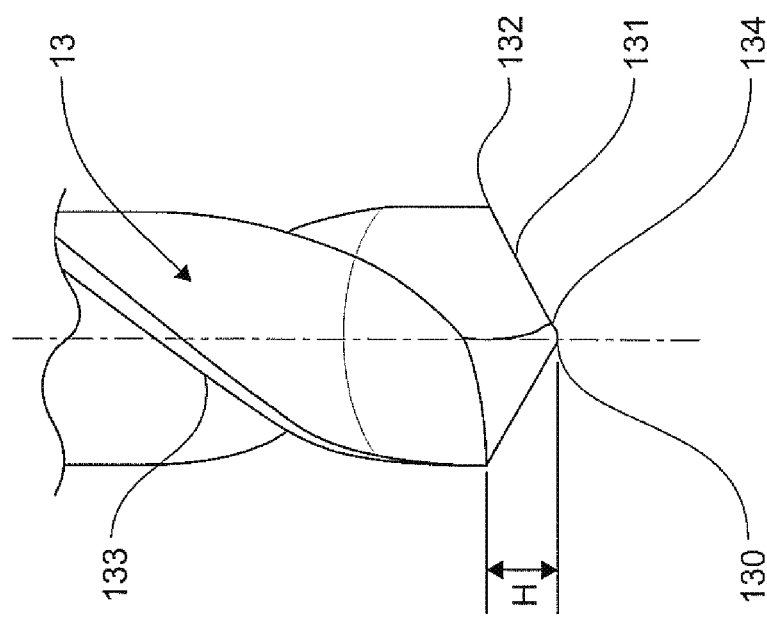

Referring to FIG. 4a, the tip of a drill bit 13 classically comprises a central edge 130 laterally extended by main edges 131 which end in cutting lips 132. The cutting lips 132 are extended by drill margins 133 that extend helically and define the diameter of the drill bit. The surface that extends between the central edge 130 and the cutting lips 132, which include the end tip 134 of the drill bit, define the cone of the drill which has a height H. The drill bit can also be a staged drill bit with different groups of cutting lips (cf. FIG. 4b).

The drill is connected by a cable to a controller 19 that comprises control means 18 for controlling the drill. The cable classically comprises power supply wires 210 for the motors and the communications wires 211. It could if necessary also comprise tubes for the passage of fluids such as lubricant.

As shall be explained in greater detail here below, these control means 18 are especially configured to control the drill in order to carry out drilling operations according to pre-programmed screwing strategies and the different steps of a method according to the invention. A drilling strategy classically comprises the conduct of a drilling operation.

These control means 18, in this embodiment, comprise a central unit 181 associated with an execution program recorded in a memory 182. The program is encoded so as to enable the implementing of the steps of the method according to the invention. This central processing unit can include a microprocessor.

This controller 19 comprises two power supply units 191, 192 used to power the drill bit rotational drive motor 14 and the feed motor 16. These power supply units can for example be inverters adapted to powering synchronous permanent magnet motors. These motors are provided with an angle sensor 141, 161, of which the signal, representing the angle of the rotor relative to the stator, is used by the inverters to properly power the synchronous motors.

This controller 19 also integrates an interface enabling the programming of drilling strategies. This interface comprises an input/output interface 193, a user interface to manage a means for introducing commands 194 (keypad, touchscreen, mouse, etc.), a display means 195 (screen, display unit, light-emitting device).

The drill can itself integrate a man/machine interface 24 that is used to start the drilling and view information on the progress of the drilling.

The controller 19 comprises a connector 196 for connection to an electric current supply source. The controller is dissociated from the drill. In one variant, it could be integrated therein, i.e. housed within the casing of the drill.

The device comprises means for measuring at least one piece of information representing the load on the drill bit during a drilling operation.

This information or these pieces of information comprise one or a combination of several pieces of information from among the following group:
  torque applied to the drill bit along its axis of rotation;
  an axial thrust force applied to said drill bit;
  electric current or power consumed by at least one of the motors of said drilling device, said drilling device comprising a rotational drive motor for the drill bit and a translational drive motor for said drill bit.

The means for measuring at least one piece of information representing the load on the drill head during a drilling operation comprise one or a combination of several of the following means:
  a sensor 22 of the torque applied to the drill bit along its axis of rotation;
  an axial thrust sensor 23 capable of measuring the force applied to the drill bit along its axis of rotation;
  a sensor 1910 of the current or electrical power consumed by at least one of the motors.

These sensors are connected to the control means 18 so that their signals can be processed.

The drilling device comprises a device or means for assessing the wear of a drill bit throughout its use in order to carry out the drilling of elements to be drilled constituted by at least one layer and at least one material, the wear of said drill bit reflecting its capacity to carry out a drilling operation that meets at least one criterion of quality of a drilling operation.

These means for assessing comprise at least:
  means for measuring or detecting at least one parameter having an effect on the wear of said drill bit, said parameter being chosen from the group comprising:
    the depth of drilling by said drill bit;
    the entry of said drill bit into an element to be drilled;
  means for determining at least one state of wear of said drill bit, each state of wear being determined as a function of one of said parameters and being characteristic of one of said criteria of quality of a drilling operation.

Each state of wear is associated with a predetermined maximum threshold, said maximum threshold of each of said states of wear being lower than or equal to a predetermined state of maximum wear beyond which the criterion of quality of which said state of wear is characteristic is no longer met.

The device according to the invention comprises means for qualifying the drill bit as an "out-of-service" drill bit or "serviceable" drill bit that are used to:
  compare each state of wear of a drill bit with the maximum threshold of state of wear of each criterion of quality recorded in the memory;
  qualify the drill bit as being "out of service" once the maximum threshold of a criterion of quality is reached and as being a serviceable drill bit so long as no maximum threshold is reached.

The device also comprises means for communicating an indication to this effect, visually and/or by sound (sending a warning message, an alarm, etc.).

As shall be described further below with reference to the method according to the invention, it can be implemented according to a simplified procedure or according to a dynamic procedure that shall be subsequently described in detail.

In the context of the implementing of the simplified procedure, the device comprises means for determining, during the performance in production of drilling operations, by means of said drill bit, on elements to be drilled made out of a same given material or a same given group of materials, of at least one state of wear of the drill bit. These means for determining comprise means for computing the totalized values of the parameter having an effect on the wear of the drill bit considered (totalized values of the depth drilled or the number of entries of the drill bit into the element to be drilled) from the start of the service life of a drill bit. The device also comprises means for recording the state of wear at each drilling operation in the memory of the drill bit.

These recording means comprise, as it happens, the reader which also makes it possible to write to the memory associated with the drill bit.

In the context of the implementing of the simplified procedure, the memory associated with each drill bit could especially contain the following pieces of information:
- one or more materials and/or groups of materials liable to be drilled;
- a maximum threshold for each state of wear proper to each material or group of materials, to each parameter having an effect on the wear and to each criterion of quality;
- at least one state of wear.

In one variant, intended for the implementing of the dynamic procedure, the means for determining at least one state of wear perform a weighting according to the effect of abrasiveness of the material or materials drilled on the wear of the drill bit. In this case, the determining of the state or states of wear takes account of the abrasive character of the materials drilled, which has an effect on the wear of the drill bit.

In the context of this weighting and as shall be seen more clearly in the following description of the method:
- each state of wear can be likened to a divergence, from a desired value, of said criterion of quality of the corresponding drilling operation;
- said divergence varies according to the totalized values of said corresponding parameter having an effect on the wear of said drill bit according to a predetermined function.

In this embodiment, the predetermined function is a polynomial regression of the divergence relative to a desired value of the criterion of quality considered as a function of the totalized values of said corresponding parameter having an effect on the wear of said drill bit according to a predetermined function.

In the context of the implementing of the dynamic procedure for the successive drilling of an element to be drilled constituted by layers of different materials and the context of taking account of the drilling depth as a parameter having an effect on the wear of the drill bit, the device comprises means for determining at least one state of wear of the drill bit making it possible, for each state of wear:
- to take account, at the start of the drilling of a given layer, of:
  - the state of wear computed following the drilling of the previous layer;
  - a predetermined polynomial regression of the divergence between said criterion of quality to which the state of wear corresponds and a desired value as a function of the totalized values of the drilling depth of said drill bit, said polynomial regression corresponding, to said drill bit, to said given material of the layer,
  - the inverse function of said polynomial regression,
- to compute a first value that is the result of said inverse function applied to said state of wear computed following the drilling of the previous layer;
- to take account of the drilled thickness in said given layer,
- to compute a second value that is the sum of the first value and of said thickness drilled in said given layer;
- to compute the state of wear at the end of drilling of said given layer, resulting from said polynomial regression applied to the second value: this state of wear is a divergence relative to the desired value of the criterion of quality considered.

In the context of the implementing of the dynamic procedure for the successive drilling of elements to be drilled, comprising at least one layer and at least one material, the material of an element to be drilled with which the drill bit first comes into contact during a drilling step constituting an attack material and the context of taking into consideration the entry of the drill bit into the element to be drilled as a parameter having an effect on the wear of the drill bit, the means for determining at least one state of wear of the drill bit make it possible, for each state of wear:
- to take account, during the detection of the entry of said drill bit into a given element to be drilled, of:
  - the state of wear computed during the detection of the entry of said drill bit into the element to be drilled of the preceding drilling step,
  - a predetermined polynomial regression of the divergence between said criterion of quality to which the state of wear corresponds and a desired value as a function of the totalized value of the detections of entry of said drill bit into an element to be drilled, said polynomial regression corresponding, to said drill bit, to the attack material of said given element to be drilled,
  - the inverse function of said polynomial regression,
- to compute a first value, from said inverse function applied to said state of wear computed at the previous drilling step;
- to compute a second value which is the sum of the first value and of the new entry,
- to compute the state of wear at the end of drilling of said given element to be drilled, resulting from said polynomial regression applied to the second value.

In the context of the implementing of the dynamic procedure, the memory associated with the drill bit could comprise especially:
- one or more groups of materials liable to be drilled;
- a maximum threshold for each state of wear;
- at least one polynomial regression:
  - for a given material;
  - for each given criterion of quality;
  - for a parameter having an effect on the given wear;
- at least one state of wear.

The device comprises means to determine the depth of drilling and/or means to determine the entry of the drill bit into the element to be drilled, these pieces of information being necessary to determine states of wear. These means are described at present.

Real-Time Detection of the Passages of the Drill Bit from Air into the Element to be Drilled or Vice Versa or from One Material to Another.

During a drilling operation, the drill bit moves in air in the course of an approach phase until it meets the element to be drilled. This air is called approach air. The drill bit then successively encounters the different materials of which the element to be drilled is constituted until it comes out of the element to be drilled. It then moves in air known as exit air.

The drilling device comprises means making it possible, during the drilling of a part constituted by several different layers of materials, to:
- carry out real-time detection of a change of material, i.e. passages of the drill bit from the approach air to the element to be drilled or from the element to be drilled to the exit air or from one material of the element to be drilled to another;
- identify the material encountered by the drill bit, the air being likened to a material.

These means do not per se constitute the object of the present invention. They shall be described here below and are called means for detecting changes of material and for determining material.

Means for detecting changes of material encountered by the drill bit have been described in the past in the context of the development of drills with controlled cutting parameters, for example in the patent document EP 0339659.

The development of such means has been made necessary for the drilling of parts formed by several layers of different materials, such as aluminum, titanium or carbon fiber alloys. These different materials require different cutting parameters, and it was therefore necessary to detect the change in material during a same drilling operation to enable the cutting parameters of the drill to be matched to the material encountered. These means implement the real-time measurement, during a drilling operation, of the values of load on the drill bit by means of measuring means for measuring at least one piece of information representing the load on the drill bit described here above.

Figure 5:
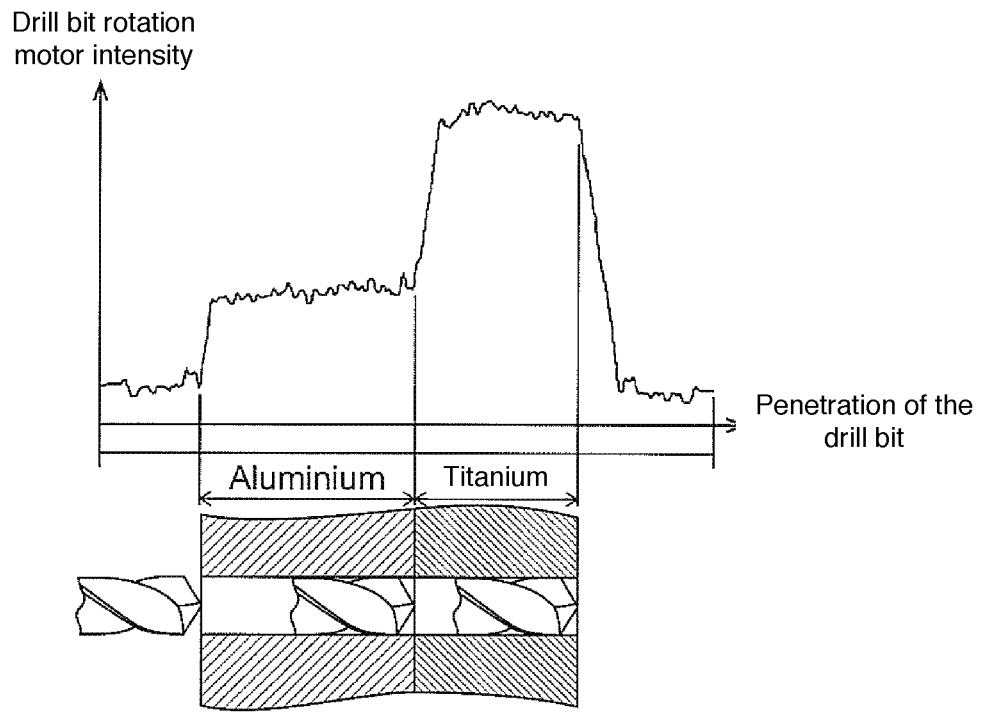
FIG. 5 illustrates the electrical current consumed by the rotational drive motor of a drill bit passing through layers of aluminum and titanium alloy.

The monitoring of the load on the drill bit enables the detection of abrupt increases or decreases in its value prompted by hardness or resilience different from one drilled material to the next. Thus, FIG. 5 illustrates the electrical intensity consumed by the rotational drive motor of a drill bit passing through layers of aluminum and titanium alloy.

These load values depend on the cutting parameters used at the time of the measurement, especially the cutting speed and the feed rate. These cutting parameters are those adapted to the material preceding the newly encountered material.

This leads to a situation where the amplitude of the values of load on the drill bit that has encountered a new material depends on the preceding material and does enable the type of new material to be determined per se. This therefore implies that, in the prior art techniques for detecting changes of material, it is necessary, prior to the drilling, to state the materials that the drill bit will encounter and the stacking order of these materials.

The means for detecting changes in material and determining a material likely to be used in the context of the present invention do not make it necessary to declare either the materials that the drill will have to encounter or their stacking order. This makes the drilling device more adaptable to the structure to be drilled, where the order of materials and the thickness of the different layers of materials will not be known to the operator in advance.

These means for detecting changes in material and for determining material enable:
real-time measurements of at least one piece of information representing the load on the drill bit;
the detection of the increase or decrease of the value of the at least one piece of information representing the measured load on the drill bit and therefore, from this, to deduce the passage of the drill bit from one material to another (a passage from approach air to a material of the element to be drilled or from a material of the element to be drilled to the exit air or from one material of the element to be drilled to another), the detection of an increase or decrease of the at least one piece of information representing the load on the drill bit corresponding to the passage of the drill bit from one material to another;
the application to the drill bit, whenever the passage from one material to another has been detected, of the predetermined reference cutting parameters: these reference cutting parameters are the same at each detection of the passage of the drill bit from one material to another and are kept for a duration sufficient to enable the total passage of the cutting lips of the drill bit into the new material;
deducing the material encountered from the at least one piece of information representing the measured load on the drill bit, while the predetermined reference cutting parameters are applied, each material drilled by a given drill bit with given reference parameters giving rise to load values of a given level. To this end, the measured value of the at least one piece of information representing the load on the drill bit is compared with a plurality of predetermined information elements representing a reference load, each corresponding to the type of drill bit used and to a different material. The material being drilled that is identified is then the one for which the information representing the reference load corresponds to the measured value of the at least one piece of information representing the load on the drill bit or, if necessary, the one for which the range of tolerance of the reference load contains the measured value of the at least one piece of information representing the load on the drill bit.

The value of the reference cutting parameters are chosen on the basis firstly of the predetermined group of materials that the drill bit is likely to drill and secondly in a way that does not give rise to any drilling defects or premature wear of the drill bit during the phase for applying reference parameters whatever the material encountered that forms part of the group.

One type of drill bit is especially characterized by its shape, its material, its coating, its diameter, etc.

The memory associated with the drill bit will contain the data needed for implementing these means for detecting changes in material and for detecting material. These are, inter alia:
predetermined reference cutting parameters for each given material or each group of given materials;
an interval or range of load values for each material liable to contain load values that the drilling of the material considered generates on the drill bit during the application of the reference cutting parameters.

However, these means for detecting changes in material and determining material could be replaced by any other means to recognize the material or air encountered by the drill bit in drilling action, and assuming for example that, in the drilling strategy, the materials encountered by the drill bit during the drilling and the stacking order of these materials are declared.

Measurement of the Depths of Materials Drilled by the Drill Bit

The drilling device comprises means for measuring the drilling depth of the drill bit for each material or group of materials drilled. This measurement is carried out between two points in time corresponding to the detection of the entry of the drill bit into the material or group of materials considered and the exit of the drill bit from the material or group of materials considered. These points in time will be determined for example by the above-described means for detecting changes in material and for determining material.

Means for measuring the drilling depth could for example comprise an angle sensor of the feed motor of the drilling device. It can for example be a brushless synchronous feed motor. This sensor, through its signal-processing electronic circuitry, provides the rotation angle of the motor.

These means for measuring the drilling depth make it possible to:

measure the rotation angle of the feed motor between two given points in time:
- either between the entry and exit of the drill bit into and from a given material forming part, as the case may be, of a group of materials of a part to be drilled. In this case, the device will comprise means described above for detecting a change of material;
- or between the entry and the exit into and from a group of materials of a part to be drilled;

convert the rotation angle of the motor measured between the two preceding points in time at a drilling depth by using the transmission ratio of the kinematic chain between the feed motor and the drill bit, which defines the ratio between the number of rotations of the feed motor and the feed travel of the drill bit.

In one variant, the means for measuring the drilling depth comprise a speed sensor placed on the kinematic chain between the feed motor and the drill. In this case, they are used to:
integrate the speed signal given by the speed sensor as a function of the time between the two given points in time to obtain the rotation angle of the element of the kinematic chain supporting the sensor:
- either between the entry and the exit of the drill bit into and from a given layer of material forming part, as the case may be, of a group of materials of a part to be drilled. In this case, the device will comprise means described here above for detecting a change in material;
- or between the entry and the exit into and from a group of materials of a part to be drilled;

deducing, from this angle, the shift of the drill bit by using the transmission ratio defining the ratio between the number of rotations of the feed motor and the feed distance of the drill bit.

Both in the context of the simplified procedure and in that of the dynamic procedure, the material or the group of materials of the element to be drilled could be selected manually, through the user interface.

6.2. Method 6.2.1. Simplified Procedure: Without Weighting of the State of Wear by the Abrasive Effect Proper to Each Material The simplified procedure is applicable to the drilling of holes in parts constituted by a single material or constituted by a stack of layers of different materials having a regular proportion between the thicknesses of these different materials from one drilling operation to the next.

Compliance with this constraint enables the setting up, in the laboratory, of a maximum threshold of state of wear of the drill head in the simplified form of a totalizing of values of depth drilled or of the number of entries by the drill head into a part to be drilled.

Figure 10A:
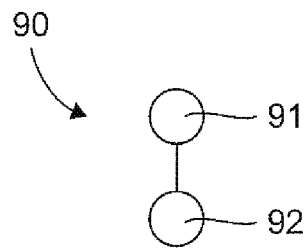
FIGS. 10a and 10b illustrate the flowcharts relating to the qualification of a drill bit according to the simplified procedure.

It comprises especially, with reference to FIG. 10a, a step 90 of laboratory assessment comprising a step 91 for determining maximum thresholds of state of wear, and a step 92 for the recording, in the memory associated with each drill, of the regulation parameters that are proper to it.

i. Determining the Maximum Threshold of State of Wear in the Laboratory

The step 91 for determining is aimed at determining a maximum threshold of state of wear beyond which a drill of a given type drilling into a material or a given group of materials can no longer be used to make holes that meet at least one criterion of quality.

To determine this maximum threshold, a laboratory test is implemented. Such a test comprises a succession of steps that differ according to whether the criterion taken into consideration is the drilling depth drilled by the drill bit or the number of entries of the drill bit into an element to be drilled.

i.1 Drilling Depth Drilled

Figure 10B:
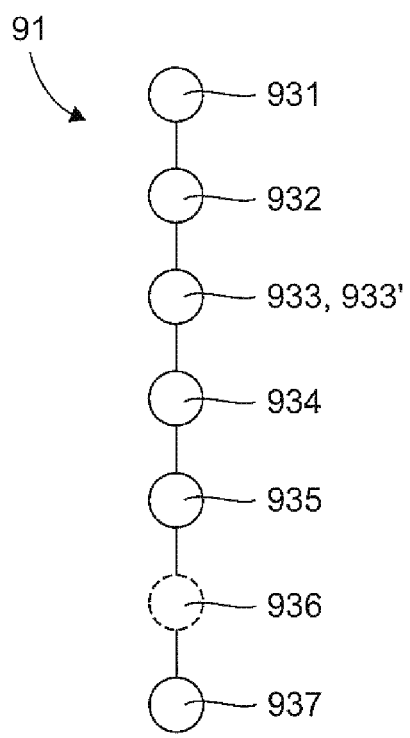

Referring to FIG. 10b, a description shall now be provided of the determining step 91 for each type of drill bits of a maximum threshold of state of wear for each criterion of quality, when the bore depth drilled by a drill bit is considered to be a parameter having an effect on the wear of a drill bit.

This step consists, for each type of drill bit and for each material and each group of materials, in carrying out at least one series of drilling operations in test specimens made said material and said group of materials with a new drill bit of the type considered at each of said series (step 931). These drilling operations are carried out with the cutting parameters suited to the material or to the group of materials. They comprise a parameter or a combination of several parameters, from among the following:
- cutting speed;
- feed rate;
- rotation frequency;
- type and level of lubrication;
- suction of chips;
- amplitude and frequency of the vibration drilling component.

Compliance with at least one criterion of quality will be checked during each of these drilling operations.

Said at least one criterion of quality of a drilling operation belongs to the group comprising:
- the tolerance values on the diameter of the bore;
- the surface condition of the walls of the bore;
- the perpendicularity of the axis of the drilling relative to the wall to be drilled;
- the cylindricity of the bore;
- the location of the bore;
- the size of the burr formed by the element to be drilled following the drilling;
- delamination at exit from a hole made through carbon fiber.

For a given drilling operation, each of the criteria of quality possesses a nominal value and a predetermined range of tolerance values depending on the quality that the drilled hole must have.

The verification of the compliance of each of these criteria of quality corresponds therefore to checking as to whether or not the value of the criterion observed during each series of drilling operations is situated within the corresponding interval of tolerances (step 932).

During each series of drilling operations, a state of wear is computed for said criterion of quality or for each of said criteria of quality (step 933). In this embodiment, it corresponds to the computation of the totalized values of the depth drilled from the beginning of the series.

The drilling operations of said at least one series are continued until said at least one criterion of quality is no longer met, i.e. until its nominal value is no longer situated in the corresponding interval or range of tolerances (step 934).

At each series, a state of wear is recorded for said criterion of quality or each of said criteria of quality as a borderline permissible state of wear when the corresponding criterion of quality is no longer met (step 935): thus, for each series of drilling operations, we obtain a permissible borderline drilling depth for each criterion of quality beyond which this criterion of quality is no longer met.

When several series of drilling operations are performed, for said state of wear or each of said states of wear, the average is computed for the permissible, recorded borderline states of wear during the series corresponding to the state of wear considered (step 936).

Then, a maximum threshold of a state of wear is determined for said criterion of quality or each of said criteria of quality, said maximum threshold being equal to or lower than said borderline or average of permissible borderline states of wear corresponding to the criterion of quality considered (step 937).

Following this assessment, for each type of drill bit, we obtain a maximum threshold of a state of wear, in this case a maximum drilling depth for each material and/or group of materials and for each criterion of quality.

Thus for a given type of drill head, for each criterion of quality, we will obtain a maximum drilling depth as the maximum threshold state of wear for such and such a material and/or for such and such a group of materials.

For example:
for the drilling of elements made of titanium with a given type of drill bit, the maximum permissible drilling depth beyond which the diameter of the bore is no longer suitable will be W meters;
for the drilling of elements comprising successive layers of titanium, aluminum and carbon fiber with a given type of drill bit, the maximum permissible drilling depth beyond which the conicity of the drilling is no longer suitable will be X meters.

i.2 Entry of the Drill Bit into an Element to be Drilled

The assessment of the type of drill bits, when the entry of the drill bit into an element to be drilled is considered to be a parameter having an effect on the wear of a drill bit shall now be described with reference to FIG. 10b.

This assessment is identical to the one just described when the parameter considered is the drilling depth except that rather than measure the totalized values of the depth drilled during each series until each of the criteria of quality is no longer met, here we measure the total of the entries of the drill bit into a test specimen (step 933'), i.e. the total number of entries of the drill bit into the element to be drilled since the beginning of the series.

Following this assessment, a maximum threshold of states of wear is obtained for each type of drill bits, in this case a maximum of entries of the drill bit into an element to be drilled for each material and/or group of materials and for each criterion of quality.

Each group of materials comprises an attack material, i.e. the material that is first drilled by the drill bit. Thus, in the case of groups of materials, the maximum number of entries into material for a given group will be related to its attack material.

Thus, for a new type of drill bit, for each criterion of quality we obtain a maximum number of entries into an element to be drilled as a maximum threshold of states of wear for such and such a material and/or for such and such a group of materials.

For example:
for the drilling of elements made of titanium and for which the first layer is made of titanium with a given type of drill bit, the maximum permissible number of entries of the drill bit into the element to be drilled beyond which the diameter of the bore is no longer suitable will be Y entries; for the drilling of elements made of aluminum or for which the first layer is made of aluminum with a given type of drill bit, the maximum permissible number of entries of the drill bit into the element to be drilled beyond which the conicity of the bore is no longer suitable will be Z entries.

i.3 Recording

The assessment also comprises a step 92 for recording the following in the memory 135 associated with each of the drill bits 13:
one or more materials and/or groups of materials;
a maximum threshold of states of wear (maximum drilling depth or maximum number of entries into an element to be drilled) for each criterion of quality and for each material and/or group of materials and for the parameter or parameters having effect on the wear of the drill bit taken into consideration.

The recording of these parameters in the memory associated with the drill bit is done by the tooling department and could be prepared with a view to future applications.

Following the preliminary laboratory assessment of different types of drill bits, we thus obtain a bank or store of different types of drill bits, each associated with drilling parameters proper to each material or group of materials liable to be drilled. Depending on the nature of the drilling (for example the bore diameter, the materials to be drilled, etc.), a drill bit of the type adapted to this drilling will be chosen, where the corresponding drilling parameters can drawn from the memory associated with the drill bit.

i.4 Data Coming from the Assessment

Figure 11:
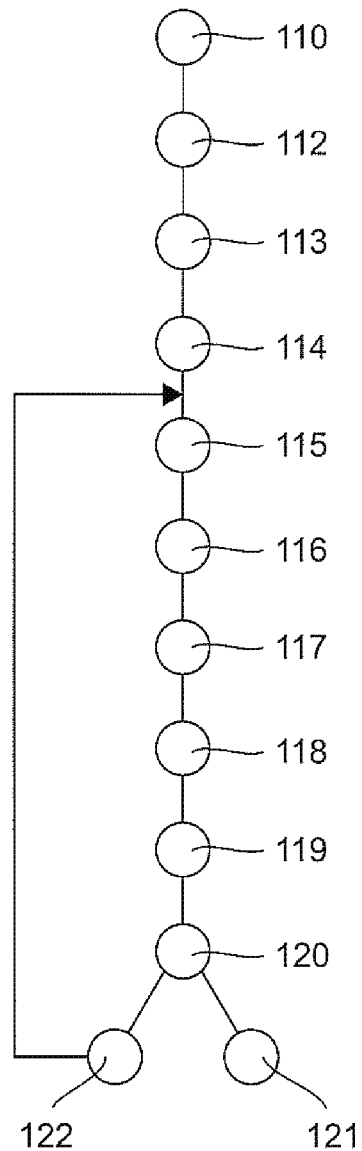
FIGS. 11 and 12 illustrate flowcharts relating to a method according to the simplified procedure of the invention.

Following the laboratory assessment, it is possible to obtain a table by type of drill bit, such as the one of FIG. 17, mentioning a maximum threshold state of wear for each criterion of quality, each parameter taken into consideration (drilling depth or number of entries into the element to be drilled) and each material or group of materials).

ii. Application of the Method in Production ii.1 Taking the Drilling Depth into Account Referring to FIG. 11, in order to carry out successive operations for drilling elements to be drilled made out of a same given material or a same given group of materials, the appropriate drill bit is chosen from the bank of available drill bits and fixedly attached to the extremity of the output shaft of the drilling device (step 110).

Each drilling operation is then carried out according to the selected strategy pre-programmed in the controller 19 (step 112), the material or the group of materials of the elements to be drilled being selected (step 113).

Using the RFID label reader 25, the controller 19 reads the contents of the memory 135 associated with the drill bit 13 so as to gather the data on the material or group of materials to be drilled (step 114). The drill bit is then taken rotationally and in translation towards the element to be drilled and then the drilling operation continues with the drilling of the element (step 116) until the drill bit exits from the element to be drilled (step 117).

Determining the Depth Drilled by the Drill Bit

During each drilling operation, the depth drilled by the drill bit is measured through the means for measuring drilling depth. To this end, the method comprises:
a step 115 for detecting the entry of the drill bit into the element to be drilled, i.e. a step for detecting the passage of the drill bit from the approach air to the element to be drilled;
a step 117 for detecting the exit of the drill bit from the element to be drilled, i.e. a step for detecting the passage of the drill bit from the element to be drilled to the exit air;
a step 118 for measuring the distance of shifting of the cutting lips of the drill bit between the entry of the drill bit into the element to be drilled and the exit of the drill bit from the element to be drilled.

The depth drilled during a drilling operation can be determined in different ways by using angle sensors or speed sensors placed on the kinematic chain between the feed motor and the drill bit.

Total Depth Drilled by the Drill Bit

At each new drilling operation, the depth drilled by the drill bit is added to the depth, if any, already recorded in its memory during previous drilling operations (step 119). The memory of the drill bit thus contains the total drilling depth from the start of its use.

Determining State of Wear

The total depth drilled by the drill bit constitutes a state of wear of the drill bit. This is compared with thresholds of maximum permissible depth of each criterion of quality recorded in the drill bit for the material or group of materials constituting the successively drilled elements to be drilled (step 120).

As soon as the maximum threshold of a criterion of quality is reached, the drill bit is qualified as an "out-of-service drill bit" and an indication (visual, sound or the like) to this effect is notified so that the drill bit is replaced and the high-quality holes are drilled (step 121).

Figure 12:
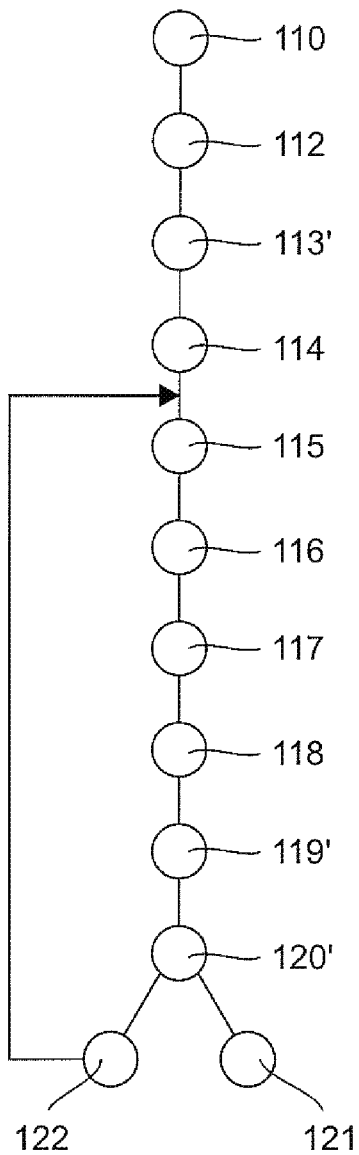

If not, the drill is qualified as a "serviceable drill bit" (step 122). New drilling cycles can then be carried out with this drill bit until it is qualified as an "out-of-service drill bit".

ii.2. Taking Account of the Entry of the Drill Bit into an Element to be Drilled When the parameter taken into account to determine the state of wear of the drill bit is no longer the depth drilled but the entry of the drill bit into the element to be drilled, the method is identical to the one that has just been described with reference to the last parameter except with respect to the following elements (with reference to FIG. 12).

As in the previous variant, the material drilled is selected at the beginning of each operation for drilling elements formed by a single material. In the case of elements formed by a given stack of materials, the material of the first layer, called the attack material, is also selected at the beginning of each drilling operation (step 113').

Determining Entry into an Element to be Drilled

In this case, rather than include a step for measuring the depth drilled at each drilling operation, the procedure comprises, at each drilling operation, a step 115 for detecting the entry of the drill bit into the element to be drilled. This step is identical to the one implemented in the previous variant during the determining of the depth drilled.

Totalized Values of Entries of the Drill Bit into an Element to be Drilled

At each new drilling operation, the entry of the drill bit into an element to be drilled is added to the values, if any, already recorded in its memory during the previous drilling operations (step '119'). The memory of the drill thus contains the total number of entries into an element to be drilled since the beginning of its use.

Determining a State of Wear

The total number of entries of the drill bit into an element to be drilled constitutes a state of wear of the drill bit. This is compared with the thresholds of maximum number of entries of each criterion of quality recorded in the drill bit for the material constituting the elements to be drilled or the first layer of the group of materials constituting the elements to be drilled that are successively drilled (step 120').

As soon as the maximum threshold of a criterion of quality is attained, the drill is qualified as an "out-of-service drill bit" and an indication to this effect is notified so that the drill bit is replaced and quality holes are drilled (step 121).

If not, the drill bit is called a "serviceable drill bit" (step 122). New drilling cycles can then be carried out with this drill bit until it is qualified as an "out-of-service drill bit".

The state of wear is updated by the controller following each drilling operation in a table of the type seen in FIG. 17.

6.2.2. Dynamic Procedure: With Weighting According to Drilled Materials

The dynamic procedure, unlike the simplified procedure, can be used to weight the determining of the state of wear of a drill bit as a function of the abrasiveness of the materials drilled by this drill bit. It therefore enables the sequencing of the drilling operations, of which the proportions between the thicknesses of the layers of the different materials show high variability from one drilling operation to the next.

i. Preliminary Assessment of the Abrasive Effects Proper to Each Material in Laboratory Conditions A method according to the invention comprises a step of preliminary assessment aimed at evaluating the abrasive effect of the different materials on a drill bit and therefore on its capacity to make holes that meet different criteria of quality. This step is carried out under laboratory conditions, i.e. outside of production. It is so to speak a parameter-setting step prior to use.

The preliminary laboratory assessment relates to the pair formed by a type of drill bit and a removable head. The removable heads may belong to different types.

The type of drill bit is especially characterized by its shape, its material, its coating, its diameter, etc.

A type of drill is especially characterized by its transmission, its motor drive, its dimensions, etc.

Figure 13A:
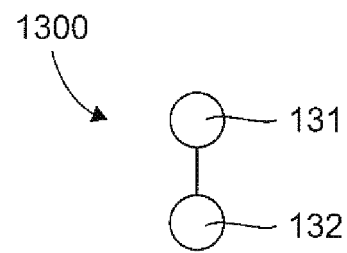
FIGS. 13a and 13b illustrate flowcharts relating to the qualification of a drill bit according to the dynamic procedure.

Referring to FIG. 13*a*, this assessment step 1300 for preliminary laboratory assessment comprises especially:

a step 131 for determining regression curves and maximum thresholds of states of wear, and a step 132 for the recording, in the memory associated with each drill bit, of the regulation parameters that are proper to it.

i.1. Regression Curve and Maximum Threshold of State of Wear

This assessment is aimed at establishing, for a given material and a given drill bit used with adequate cutting parameters, a relationship between the totalized values of the depth drilled or the number of entries and the divergence relative to a given criterion of quality. This relationship takes the form of a mathematical function.

The criteria of quality of a drilling operation that can be taken into consideration belong to the group comprising:

the values of tolerance on the diameter of the bore;
the surface condition of the walls of the bore;
the perpendicularity of the drilling axis relative to the wall to be drilled;
the cylindricity of the bore;
the location of the bore;
the size of the burr formed on the element to be drilled following a drilling operation;
the delamination at the exit from a hole made through a carbon fiber.

Each of the criteria of quality possesses, for a given drilling operation, a nominal value and an interval or range of tolerances predetermined as a function of the quality that the drilled hole must have. Each of the criteria of quality possesses a predetermined desired value as a function of the quality that the drilled hole must have. This value is preferably situated within this interval of tolerance values.

Figure 13B:
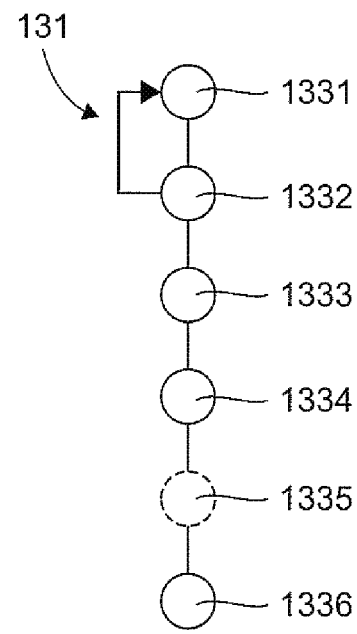

The step 131 for determining regression curves and maximum thresholds of state of wear comprises, with reference to FIG. 13b, for each type of drill bits and for each material, the performance of at least one series of drilling operations, in test specimens made out said material, with a new drill bit of the type considered at each of said series (step 1331).

After each of the drilling operations of said at least one series, the divergence between the value of said criterion of quality or each of said criteria of quality chosen and said desired value corresponding to the criterion considered is measured (step 1332).

By way of an example, in the context of compliance with a tolerance on diameter, the divergence can be the difference between the diameter made and the midpoint of the tolerance values. Ideally, this difference must be zero when the drill bit is new and it can increase as and when the drill bit gets worn out until it reaches a value beyond which the drill bit is no longer within the requisite tolerance value.

The divergence between the value of the criterion of quality considered and said desired value as a function of the totalized values of the parameters having an effect on the wear of said drill bit is recorded for said criterion of quality or each of said criteria of quality (step 1333).

The drilling operations of said at least one series are continued until said at least one criterion of quality is no longer met (step 1334), i.e. until its value is not situated within the corresponding range of tolerance values.

When several series of drilling operations are carried out, a computation is made, for said criterion of quality or each of said criteria of quality, of the average of said differences as a function of the totalized values of the parameters having an effect on the wear of said drill bit (step 1335).

A computation is carried out, for said criterion of quality or each of said criteria of quality, of a polynomial regression of said divergence or of the average of said divergences as a function of the totalized values of the parameters having an effect on the wear of said drill bit (step 1336).

We then obtain, for each type of drill bit, for each material and for each criterion of quality, a polynomial regression curve of the divergence or the average of the divergences between the value of the criterion of quality considered and said corresponding desired value as a function of the totalized values of the parameters having an effect on the wear of said drill bit, i.e. the depth drilled or the number entries of the drill bit into an element to be drilled. It is the taking into account of these regressions that makes it possible to weight the state of wear of a drill bit as a function of the abrasiveness of the materials drilled.

Figure 6:
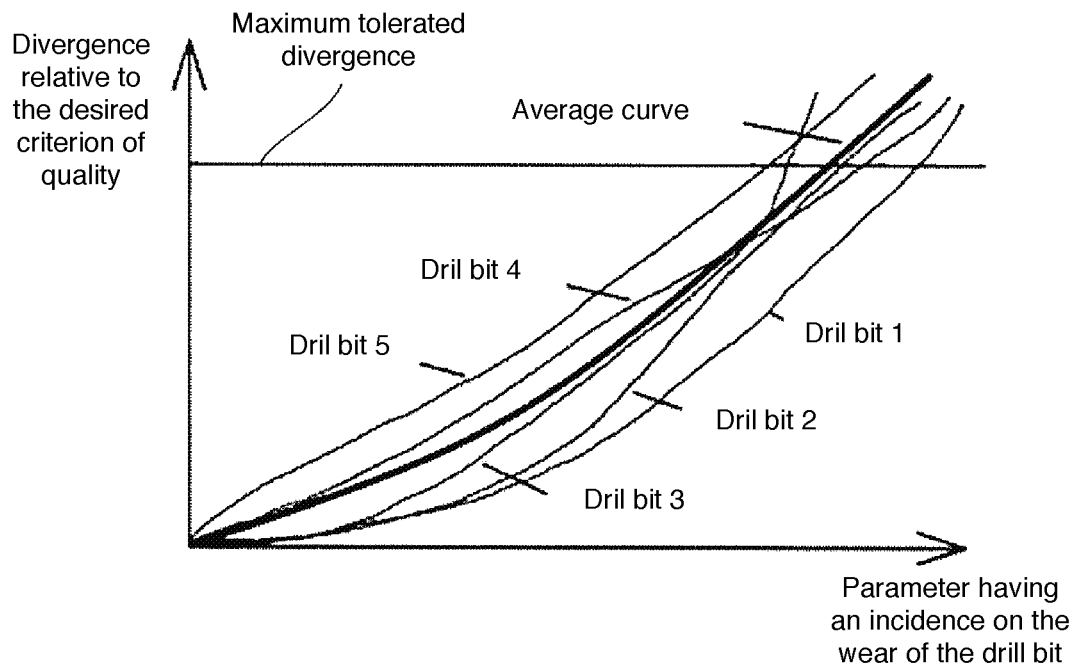
FIGS. 6, 7 and 8 are examples of polynomial regression curves according to the invention.

Such a curve can be seen in FIG. 6. For each drill bit, in this case five drill bits in the example shown, of a same type of drill bit used during a series of drilling operations, this curve illustrates the recording, in the form of a regression curve, of the variation of the divergence relative to the criterion of quality of the drilling operation taken into account during the trial considered (divergence from the desired diameter, the desired conicity, etc.). This variation is considered as a function of the parameter having an effect on the wear of the drill bit taken into account during the test considered (drilling depth or number of entries into an element to be drilled). The average regression curve obtained from all the curves is also shown in FIG. 6.

A maximum threshold (maximum tolerated difference) is fixed for the divergence between the observed value of each criterion of quality during a drilling operation and said corresponding desired value (maximum tolerated divergence). This threshold is chosen such that, beyond it, the criterion of quality is no longer met.

For each type of drill bit, we thus obtain a regression curve illustrating the variation of a parameter having an effect on the wear of the drill bit as a function of a divergence from the desired value of a criterion of quality, and this for each material and each parameter having an effect on the wear of the drill bit taken into consideration and for each criterion of quality taken into consideration.

Figure 7:
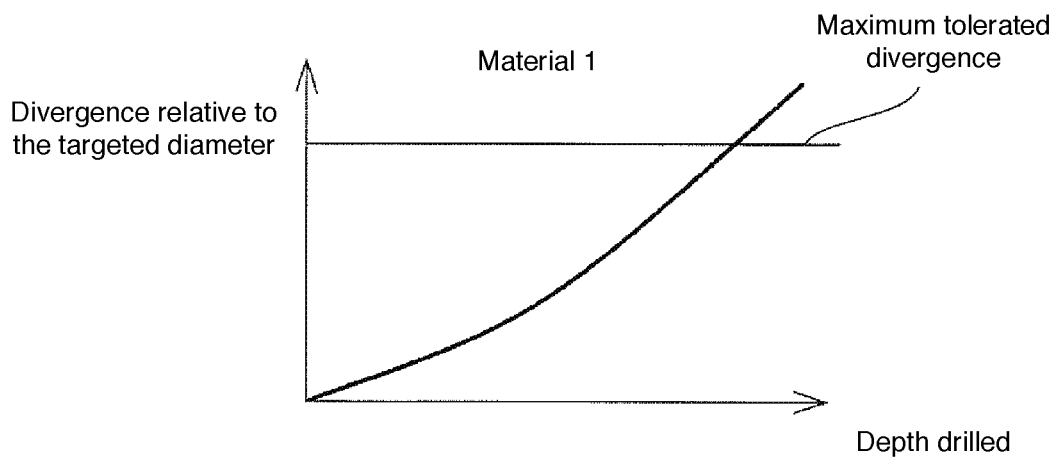

FIG. 7 illustrates, for example, the variation of the divergence with the desired diameter as a function of the drilled depth of a given material 1 by means of a given type of drill bit.

Figure 8:
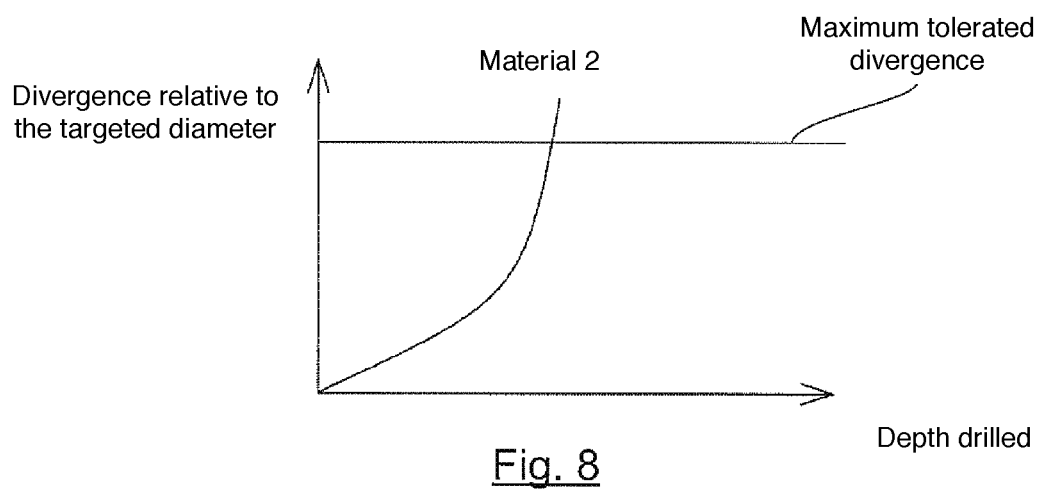

FIG. 8 illustrates for example the variation of the divergence with the desired diameter as a function of the drilled depth of a given material 2 drilled by means of a drill bit of a given type.

i.2. Recording

The assessment 1300 also comprises a step of recording 132, in the memory 135 associated with each of the drill bits 13, of:
- one or more groups of materials;
- a polynomial regression function of the divergence or of the average of the divergences between the value of the criterion of quality considered and said desired value for each material, for the parameter or parameters having an effect on the wear taken into consideration, and for each criterion of quality; the inverse function of each polynomial regression function;
- a maximum permissible threshold for each criterion of quality, for each group of materials and for the parameter or parameters having an effect on the wear taken into consideration.

The recording of these pieces of information in the memory associated with the drill bit will be carried out by the tooling department and could be the subject of preparation and planning for future operations.

Following the preliminary laboratory assessment of different types of drill bits, we thus obtain a data bank that can be used to assess the state of wear of each type of drill bit in a situation of production.

i.3. Data Coming from the Preliminary Assessment

Figure 14:
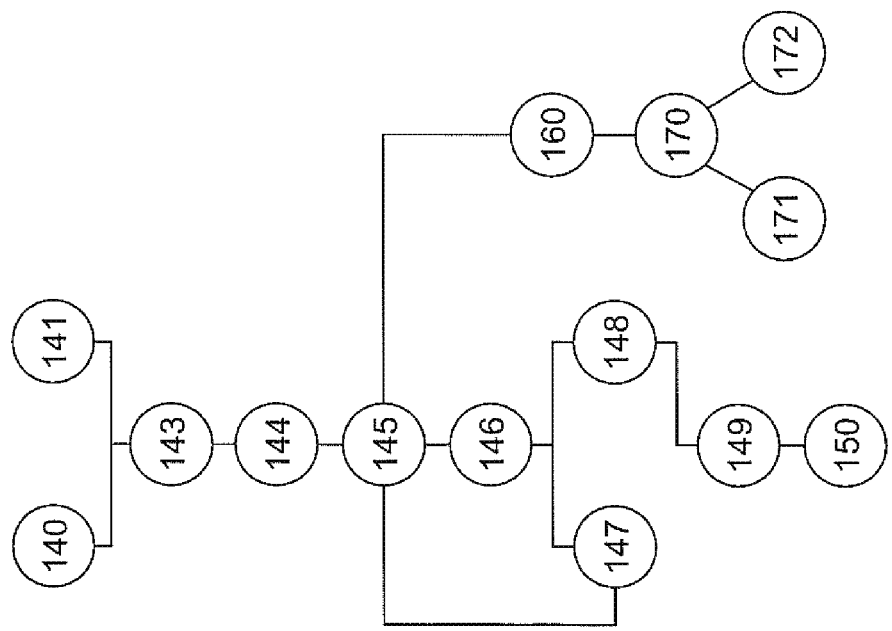

Following the preliminary assessment, it is possible to obtain a table by type of drill bit, such as the one of FIG. 18, mentioning a polynomial regression function and its inverse function as well as a maximum threshold for each criterion of quality, each parameter taken into consideration (drilling depth or number of entries into the element to be drilled) and each material or group of materials.

ii. Application of the Method in Production ii.1. Taking Account of the Drilling Depth Referring to FIG. 14, in order to carry out an operation for drilling an element comprising a stack of a succession of layers of different materials forming a group of materials, the appropriate drill bit provided with its removable head will be chosen from the bank of drill bits available and fixedly attached to the drilling device (step 140 for choosing a drill bit). The choice of the appropriate drilling strategy is also made (step 141 for choosing a drilling strategy). When several groups of materials are recorded in the memory of the drill bit, the drilling strategy chosen can induce the selection of the corresponding group.

Then, using the RFID label reader 25, the controller 19 reads the content of the memory 135 associated with the drill bit 13 (step 143 for reading the memory associated with the drill bit).

The drilling operation is then started (step 144) according to the strategy pre-programmed in the controller 19 including the approach of the drill bit toward the element to be drilled, the drilling of this element, the exit of the drill bit from the element to be drilled and the retraction of the drill bit. A drilling strategy is defined by type of drilling performed with a given drill bit in a part constituted by several given layers of given materials. It defines the cutting parameters for each of the drilling phases: the approaching of the drill towards the part to be drilled, the drilling of each of the layers of material, the exit and retraction of the drill bit.

The means for detecting changes in material and determining material are implemented as soon as the drilling operation begins.

During the progress of the drill bit towards the part to be drilled and then through the part to be drilled, the means for detecting changes of material and for determining material implement a step for detecting the entry of the drill bit into the part to be drilled or for detecting the passage of the drill bit from one layer of material to the next (step 145).

An entry into the part to be drilled is differentiated from a change in material by the fact that it consists of the passage from the approach air to a full material and a change of material by the passage from one full material to another.

Each step 145 for detecting an entry into the part to be drilled or a change of material (passage of the drill from one material to another) is followed by a step 146 for determining the material encountered. The identification of the exit air as a material encountered constitutes a step for detecting the exit of the drill bit from the part to be drilled.

Whenever a new material is identified (step 146), the controller of the drilling device applies the cutting parameters adapted to this material to the drill in order to carry out the drilling of this material (step 147).

After the drill bit has passed through the part to be drilled, expressed by the detection of air at the exit as a material encountered by the drill bit (step 148), the controller brings about the retraction of the drill bit (retraction step 149).

Once the full retraction of the drill bit is completed, the motors are stopped and a drilling report is recorded by the controller and if necessary exported towards a computer network aimed at ensuring the traceability of the produced items (step 150).

Whenever a change in material is detected (step 145), corresponding to the end of the drilling of the layer of material that has just been drilled, a step for determining at least one state of wear of said drill bit as a function of the depth of drilling is implemented (step 160).

Figure 15:
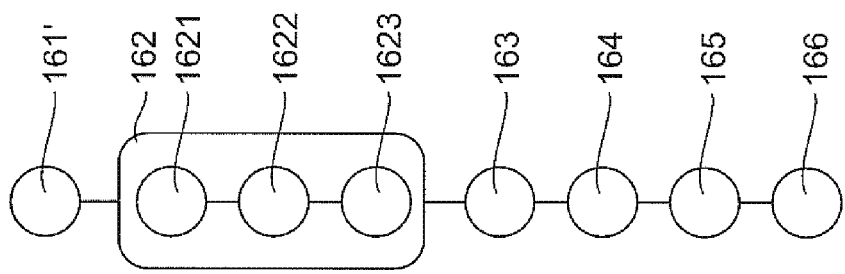

To this end, referring to FIG. 15, the depth of drilling drilled through the layer of material that has just been drilled is determined (step 161'). This computation is done as described further above with reference to the simplified procedure, taking account no longer of the instant of entry of the drill bit into the element to be drilled and the instant of exit of the drill bit into the air but the instant of entry of the drill bit into the layer considered and the instant of exit of the drill bit from this layer.

The step for determining at least one state of wear of said drill bit following the drilling of a layer comprises, for each state of wear, the following steps:

taking account, at the start of the drilling of the layer of material that has just been drilled (step 162), of
the state of wear computed following the drilling of the previous layer (if the layer that has just been drilled is the first layer, this state of wear is zero) (step 1621);
the polynomial regression corresponding to said drill bit, the layer that has just been drilled, and the criterion of quality to which the state of wear corresponds as a function of the drilled depth (step 1622),
the inverse function of said polynomial regression (step 1623),
computing a first value, which is the result of said inverse function applied to said state of wear computed following the drilling of the previous layer (step 163);
taking account of the thickness drilled in said layer that has just been drilled (step 164),
computing a second value, which is the sum of the first value and of said thickness drilled in said layer that has just been drilled (step 165),
computing the state of wear following drilling of said given layer, resulting from said polynomial regression applied to the second value (step 166): this state of wear is a divergence from the desired value of the criterion of quality considered.

Figure 9:
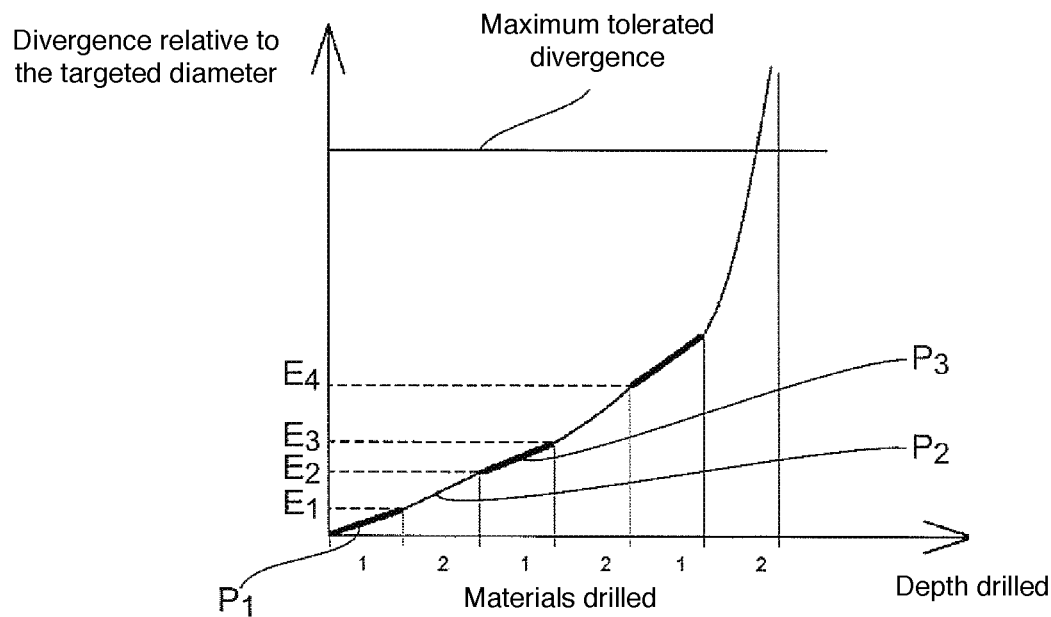
FIG. 9 illustrates a curve of determination of the state of wear of a drill bit according to the dynamic procedure.

This principle is represented by the curve illustrated in FIG. 9 for an example according to which the elements to be drilled, comprising the stack of two different materials, called material 1 and material 2, are drilled successively in taking account of the drilled depth as the parameter having an effect on the drilling depth and the desired diameter as criteria of quality of the drilling.

The first material drilled is the material 1. Following the drilling of this layer of material 1, the drilled depth is determined. Then, from this drilled depth and the curve of FIG. 7, the corresponding state of wear E1, i.e. the divergence relative to the objective diameter, is determined and recorded in the memory of the drill bit. We thus obtain the first portion P1 of the curve of FIG. 9. Then, we begin the drilling of the next layer of material 2. Following this drilling, the depth drilled in this material is determined. Then, on the basis of the value of the state of wear E1 previously computed following the drilling of the preceding layer of material 1, the inverse function of the curve illustrated in FIG. 8 is applied in order to determine the corresponding drilling depth. The value of this depth is added to the value of the drilling depth made through the layer of material 2. Then, on the basis of the value of the sum of depths thus obtained, the corresponding state of wear E2 is determined from the curve of FIG. 8 and recorded in the memory of the drill bit. The second portion P2 of the curve of FIG. 9 is thus obtained. Then, the drilling of a new layer of material is begun. Following this drilling, the depth drilled in this layer is determined. Then, on the basis of the value of the state of wear E2 previously calculated following the drilling of the previous layer of material 2, the inverse function of the curve illustrated in FIG. 7 is applied in order to determine the corresponding drilling depth. The drilling depth achieved through the layer of material 1 is added to the above value. Then, on the basis of the value of the sum of the depths thus obtained, we determine, from the curve of FIG. 7, the corresponding state of wear E3 and this state of wear is recorded in the memory of the drill bit. The drilling operations are thus continued until the maximum threshold of the state of wear, in other words the maximum tolerated divergence from the criterion of quality considered, is reached.

Each time a new layer of material is drilled, a state of wear is thus determined for each criterion of quality.

When the parameter affecting the wear of the drill bit is the drilling depth, then the state of wear for each criterion will be a divergence from the desired value of this criterion determined in considering the polynomial curves of the materials drilled expressing the variation of such a divergence from the depth drilled.

Each state of wear is compared with the corresponding maximum permissible threshold (step 170).

As soon a state of wear reaches its maximum permissible threshold, the drill bit is qualified as a "out-of-service drill bit" and this information is notified (step 171).

So long as no state of wear has reached its maximum permissible threshold, the drill bit is qualified as a "serviceable drill bit" and this information is notified (step 173).

ii.2. Taking Account of the Number of the Entries of the Drill in an Element to be Drilled When the parameter having an effect on the wear of the drill bit taken into account is no longer the drilling depth but the number of entries of the drill bit in an element to be drilled, the working of the method is identical except that the state of wear is computed only once by drilling an element to be drilled, and this is done after identification, at the step 145, of the entry into the part to be drilled.

The polynomial curves considered are those expressing the variation of the divergences between the criteria of quality and the desired values as a function of the number of entries of the drill bit into the element to be drilled, as well as the corresponding maximum thresholds.

The method comprises successive steps for drilling elements to be drilled comprising at least one layer and at least one material, the material of an element to be drilled with which the drill bit comes first into contact during a step of drilling constituting an attack material.

Figure 16:
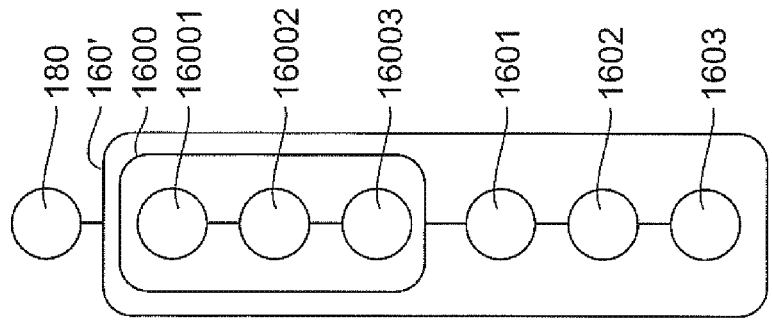
FIGS. 14, 15 and 16 illustrate the flowcharts relating to a method according to the dynamic procedure of the invention.

With reference to FIG. 16, the method comprises, at each drilling operation, a step (180) for determining the attack material of the element drilled. This step works according to the same principle as the step for determining the material described in the context of the previous variant.

The method comprises, during each step for drilling an element to be drilled, a step 160' for determining at least one state of wear of said drill bit as a function of the entry of said drill bit into the element to be drilled, the step for determining at least one state of wear of said drill bit comprising, for each state of wear, the following steps:

taking account, during the detection of the entry of said drill bit into a given element to be drilled (step 1600) of the state of wear computed during the detection of the entry of said drill bit into the element to be drilled of the previous drilling step (if the element drilled is the first that the drill bit is drilling, then the state of wear is zero) (step 16001), polynomial regression corresponding to said drill bit, to the attack material of said given element to be drilled, and to the criterion of quality to which said state of wear corresponds as a function of the detection of the entry of said drill bit into an element to be drilled (step 16002), the inverse function of said polynomial regression (step 16003), computing a first value, resulting from said inverse function, applied to said state of wear computed at the previous drilling step (step 1601), computing a second value, which is the sum of the first value and of the new entry (step 1602), computing the state of wear of the end of drilling of said given element to be drilled, resulting from said polynomial regression applied to the second value (step 1603).

Each time a new layer of material is drilled, we thus determine a state of wear for each criterion of quality.

The state of wear is updated by the controller following each drilling in a table of the type seen in FIG. 18.

6.3. Variants

In variants of the simplified and dynamic procedures:

only one criterion of quality or else a plurality of criteria of quality could be considered for the qualification of a drill bit;

only one parameter having an effect on the wear of the drill bit or else both could be considered to determine states of wear.

In the context of the dynamic procedure, the material or the group of materials of the elements successively drilled could be entered into the drilling strategy rather than be detected automatically. In the case of a group of materials, the order of stacking of the layers will be then also entered. When the number of entries into an element to be drilled is taken into account, the attack material of the group of materials of which the successively drilled elements are constituted could also be selected by hand rather than be detected automatically.

In another variant, the detection of the changing of material will use the derivative, as a function of time, of the value of said at least one piece of information representing the load on the drill bit. In this case, the method will comprise a step for computing the derivative, as a function of time, of the measured value of the load on the drill bit which will be compared with a predetermined threshold, and the attaining of this threshold will correspond to a change in material. This threshold will be experimentally predetermined for each material and for each type of drill bit by having it drilled with a drill bit and determining, for it, an average value of derivative relative to the time of said at least one piece of information representing the load on the drill bit which will be recorded as a threshold.

For certain criteria of quality, the divergence between the value of the criterion of quality and its desired value as a function of the totalized values of drilling depth or of the totalized number of entries into the material can change suddenly following a certain drilling depth or following a certain number of entries into the material. For other criteria of quality, this divergence can, on the contrary, develop gradually. In the former case, the simplified procedure will be preferably implemented whereas in the latter case the dynamic procedure will be preferably implemented. A hybrid method between the simplified procedures and the dynamic procedures can be envisaged. It could consist in making a real-time computation of a state of wear as being the totalized values of depth drilled in a material during the drilling of a part constituted by several different materials.

Thus, in variants, certain criteria could be determined, during the implementing of a same method, according to the dynamic procedure and others could be implemented according to the simplified procedure. An example of a technical solution has been described further above to determine the instant at which the drill bit enters the element to be drilled and the instant at which it comes out as well as to detect the passage of the drill bit from a one layer of a material to another and to identify this material. These techniques are described by way of illustrations and could be replaced by different solutions known to those skilled in the art. Such techniques can be based on the measurement of the progress of the load on the drill bit which enables changes in material to be detected.

An exemplary embodiment of the invention is aimed especially at providing an efficient solution to at least some of the different problems discussed above with respect to the prior art.

In particular, at least one embodiment provides a technique for assessing the wear of a drill bit that optimizes the use of the drill bit by preventing:

its premature replacement when it is still capable of carrying out a drilling operation that meets the requisite criteria of quality, or its overdue replacement even after its use causes bore holes that do not meet the requisite criteria of quality.

At least one embodiment procures a technique of this kind that optimizes the management of a fleet of cutting tools, especially the renewal of drill bits, in providing a level of wear for each of these tools.

At least one embodiment procures a technique of this kind that prevents the deterioration of the quality of the drillings.

At least one embodiment provides techniques of this kind that are simple and/or reliable and/or efficient.

Although the present disclosure has been described with reference to one or more examples, workers skilled in the art will recognize that changes may be made in form and detail without departing from the scope of the disclosure and/or the appended claims.

The invention claimed is:

1. A method for assessing wear of a drill bit throughout its use for carrying out drilling of elements to be drilled constituted by at least one layer and at least one material, the wear of said drill bit expressing its capacity to perform a drilling that meets at least one criterion of quality of a drilling, said method comprising at least the following acts:

measuring or detecting at least one parameter having an effect on the wear of said drill bit, said parameter being chosen from the group consisting of:
  a depth of drilling performed by said drill bit;
  entry of said drill bit into said element to be drilled;
determining at least one state of wear of said drill bit, each state of wear being determined as a function of one of said parameters and being characteristic of one of said criteria of quality of a drilling, the determining of at least one state of wear of said drill bit comprising a weighting as a function of an effect of abrasiveness of the drilled material or materials on the wear of the drill bit, in context of said weighting:
  each state of wear is likened to a divergence from a desired value of said criterion of quality of the corresponding drilling;
  said divergence varies as a function of totalized values of said corresponding parameter having an effect on the wear of said drill bit according to a predetermined function;
during drilling of an element constituted by a stack of layers of different materials, determining the at least one state of wear of said drill bit as a function of the depth of drilling following the drilling of each of the at least one layer of the at least one material, wherein the determining at least one state of wear of said drill bit following the drilling of a layer comprises, for each state of wear, the following acts:
  taking into account, at a start of the drilling of a given layer, of,
    the state of wear computed following the drilling of a previous layer;
    a predetermined polynomial regression of divergence between said criterion of quality, to which the state of wear corresponds, and a desired value as a function of totalized values of the depth of drilling of said drill bit, said polynomial regression corresponding to said drill bit, to said material of said given layer,
  an inverse function of said polynomial regression, computing a first value, resulting from said inverse function applied to said state of wear computed following the drilling of the previous layer;
  taking account of a thickness drilled in said given layer, computing a second value, which is a sum of the first value and of said thickness drilled in said given layer, and
  computing the state of wear at an end of drilling of said given layer, resulting from said polynomial regression applied to the second value.

2. The method according to claim 1, wherein each state of wear is associated with a predetermined maximum threshold, said maximum threshold of each of said states of wear being lower than or equal to a predetermined maximum state of wear beyond which the criterion of quality of which said state of wear is characteristic is no longer met.

3. The method according to claim 2, wherein each state of wear is associated with a predetermined maximum threshold, said act of determining at least one state of wear of said drill bit comprising, during performance, in production, of drilling operations in an element to be drilled using said drill bit, the qualification of said drill bit as:
  a "serviceable drill bit" so long as said maximum threshold of said at least one state of wear of said drill bit is not reached;
  a "drill bit out of service" from the instant when the maximum threshold of at least one state of wear of said drill bit is reached.

4. The method according to claim 3, comprising sending a message indicating that the drill bit is out of service once the "out-of-service" qualification is assigned to the drill bit.

5. The method according to claim 1, comprising a preliminary act of laboratory assessment of at least one type of drill bits for at least one material, said assessment comprising, for each type of drill bit and for each material:
  performance of at least one series of drillings in test specimens made out of said material with a new drill bit of a considered type at each of said series;
  measurement, after each of the drilling operations of said at least one series, of divergence between the value of said criterion of quality or of each of said criteria of quality and said desired value corresponding to the criterion considered;
  recording, for said criterion of quality or each of said criteria of quality, of the divergence between the value of the criterion of quality considered and said desired value as a function of the totalized values of the parameter having an effect on the wear of said drill bit corresponding to the criterion of quality considered;
  continuation of drilling operations of said at least one series until said at least one criterion of quality is no longer met;
  when several series of drilling operations are performed, computation for said criterion of quality or each of said criteria of quality of an average of said divergences as a function of the totalized values of the parameter having an effect on the wear of said drill bit corresponding to the criterion of quality considered;
  computation, for said criterion of quality or each of said criteria of quality, of a polynomial regression of said divergence or of the average of said divergences as a function of the totalized values of the parameter having an effect on the wear of said drill bit corresponding to the criterion of quality considered, said polynomial regression constituting said predetermined polynomial regression used in said weighting.

6. The method according to claim 5, a memory being associated with each drill bit, said act of assessment comprising recording the following in the memory associated with each drill:
a maximum threshold for at least one state of wear proper to a criterion of quality and to a parameter having an effect on the wear;
at least one polynomial regression:
for a given material;
for a given criterion of quality;
for a parameter having an effect on the given wear.

7. The method according to claim 1, furthermore comprising recording, in the memory associated with each drill bit during its use to drill the elements to be drilled, of at least one state of wear.

8. The method according to claim 1, wherein said at least one criterion of quality of a drilling belongs to the group consisting of:
tolerance values on a diameter of a bore;
a surface condition of bore walls;
perpendicularity of an axis of the drilling relative to a wall to be drilled;
cylindricity of the bore;
location of the bore;
size of a burr formed on the element to be drilled following a drilling operation;
delamination at exit from a hole made through the element.

9. A device for assessing wear of a drill bit throughout its use in order to carry out drilling of elements to be drilled constituted by at least one layer and at least one material, the wear of said drill bit expressing its capacity to carry out a drilling meeting at least one criterion of quality of a drilling, said device comprising at least:
a sensor configured to measure or detect at least one parameter having an effect on the wear of said drill bit, said parameter being chosen from the group consisting of:
a drilling depth drilled by said drill bit;
an entry of said drill bit into the element to be drilled;
a processor configured to determine at least one state of wear of said drill bit, each state of wear being determined as a function of one of said parameters and being characteristic of one of said criteria of quality of a drilling, said processor being configured to carry out a weighting as a function of the effect of abrasiveness of the drilled material or materials on the wear of the drill bit, in a context of said weighting of which:
each state of wear is likened to a divergence relative to a desired value of said criterion of quality of the corresponding drilling;
said divergence varies as a function of totalized values of said corresponding parameter having an effect on the wear of said drill bit according to a predetermined function;
wherein said processor configured to determine the at least one state of wear of said drill bit as a function of the depth of drilling following the drilling of each of said at least one layer of the at least one material of which an element to be drilled is constituted, said processor is further configured to, for each state of wear:
take the following into account at a beginning of the drilling of a given layer:
the state of wear computed following the drilling of a previous layer;
a predetermined polynomial regression of divergence between said criterion of quality, to which the state of wear corresponds, and a desired value as a function of totalized values of the depth of drilling of said drill bit, said polynomial regression corresponding to said drill bit, to said material of said given layer;
an inverse function of said polynomial regression;
compute a first value, resulting from said inverse function applied to said state of wear computed following the drilling of the previous layer;
take account of a thickness drilled into said given layer, compute a second value, which is a sum of the first value and of said thickness drilled in said given layer, compute the state of wear at the end of drilling of said given layer, resulting from said polynomial regression applied to the second value.

10. The device according to claim 9, wherein each state of wear is associated with a predetermined maximum threshold, said maximum threshold of each of said states of wear being lower than or equal to a state of predetermined maximum wear beyond which the criterion of quality of which said state of wear is characteristic is no longer met.

11. The device according to claim 10, wherein said processor is further configured to qualify said drill bit as:
a "serviceable drill bit" that is serviceable so long as said maximum threshold of said at least one state of wear of said drill bit is not reached;
an "out-of-service drill bit" that is out of service starting from the instant when the maximum threshold of at least one state of wear of said drill bit is reached.

12. The device according to claim 11, wherein said processor is further configured to send out a message indicating that the drill bit is out of service as soon as the "out-of-service" qualification is assigned to the drill bit.

13. The device according to claim 9, wherein each drill bit is associated with a memory containing:
at least one material or at least one group of materials;
a maximum threshold for each state of wear proper to each material or group of materials, proper to each parameter having an effect on the wear and proper to each criterion of quality;
at least one state of wear.

14. The device according to claim 13, wherein said processor is further configured to record, in the memory associated with said drill bit, during performance, in production, of drilling operations using said drill bit in elements to be drilled made out of a same given material or a same given group of materials, of at least one state of wear as being totalized values of said corresponding parameter having an effect on the wear of said drill bit.

15. The device according to claim 9, comprising a memory associated with each drill bit containing:
a maximum threshold of at least one state of wear;
at least one polynomial regression:
for a given material;
for a given criterion of quality;
for a parameter having an effect on the given wear;
at least one state of wear.

16. The device according to claim 9, wherein said at least one criterion of quality of a drilling operation belongs to the group consisting of:
tolerance values on a diameter of a bore
surface condition of bore walls;
perpendicularity of an axis of the drilling relative to a wall to be drilled;
cylindricity of the bore;
location of the bore;
size of a burr formed on the element to be drilled following a drilling operation;

delamination at the exit from a hole made through the element.

17. A method for assessing wear of a drill bit throughout its use for carrying out drilling of elements to be drilled constituted by at least one layer and at least one material, the wear of said drill bit expressing its capacity to perform a drilling that meets at least one criterion of quality of a drilling, said method comprising at least the following acts:
measuring or detecting at least one parameter having an effect on the wear of said drill bit, said parameter being chosen from the group consisting of:
a depth of drilling performed by said drill bit;
entry of said drill bit into said element to be drilled;
determining at least one state of wear of said drill bit, each state of wear being determined as a function of one of said parameters and being characteristic of one of said criteria of quality of a drilling, the determining of at least one state of wear of said drill bit comprising a weighting as a function of an effect of abrasiveness of the drilled material or materials on the wear of the drill bit, in context of said weighting:
each state of wear is likened to a divergence from a desired value of said criterion of quality of the corresponding drilling;
said divergence varies as a function of totalized values of said corresponding parameter having an effect on the wear of said drill bit according to a predetermined function; and
successive acts of drilling the elements to be drilled comprising the at least one layer and the at least one material, the material of the element to be drilled with which the drill bit first comes into contact during a drilling act, constituting an attack material, said method comprising, in the course of each act of drilling the element to be drilled, an act of determining the at least one state of wear of said drill bit as a function of the entry of said drill bit into the element to be drilled, the act of determining at least one state of wear of said drill bit comprising, for each state of wear, the following acts:
taking account, during the detection of the entry of said drill bit into a given element to be drilled, of
the state of wear computed during the detection of the entry of said drill bit into the element to be drilled of the previous drilling act,
a predetermined polynomial regression of divergence between said criterion of quality, to which the state of wear corresponds, and a desired value as a function of totalized values of detection of the entry of said drill bit into an element to be drilled, said polynomial regression corresponding to said drill bit, to said attack material of said given element to be drilled,
an inverse function of said polynomial regression,
computing a first value resulting from said inverse function applied to said state of wear computed at the previous drilling act,
computing a second value which is a sum of the first value and of the new entry, and
computing the state of wear at the end of drilling of said given element to be drilled, resulting from said polynomial regression applied to the second value.

18. The method according to claim 17, wherein each state of wear is associated with a predetermined maximum threshold, said maximum threshold of each of said states of wear being lower than or equal to a predetermined maximum state of wear beyond which the criterion of quality of which said state of wear is characteristic is no longer met.

19. The method according to claim 18, wherein each state of wear is associated with a predetermined maximum threshold, said act of determining at least one state of wear of said drill bit comprising, during performance, in production, of drilling operations in the element to be drilled using said drill bit, the qualification of said drill bit as:
a "serviceable drill bit" so long as said maximum threshold of said at least one state of wear of said drill bit is not reached;
a "drill bit out of service" from the instant when the maximum threshold of at least one state of wear of said drill bit is reached.

20. The method according to claim 19, comprising sending a message indicating that the drill bit is out of service once the "out-of-service" qualification is assigned to the drill bit.

21. A device for assessing wear of a drill bit throughout its use in order to carry out drilling of elements to be drilled constituted by at least one layer and at least one material, the wear of said drill bit expressing its capacity to carry out a drilling meeting at least one criterion of quality of a drilling, said device comprising at least:
a sensor configured to measure or detect at least one parameter having an effect on the wear of said drill bit, said parameter being chosen from the group consisting of:
a drilling depth drilled by said drill bit;
an entry of said drill bit into the element to be drilled;
a processor configured to determine at least one state of wear of said drill bit, each state of wear being determined as a function of one of said parameters and being characteristic of one of said criteria of quality of a drilling, said processor being configured to carry out a weighting as a function of the effect of abrasiveness of the drilled material or materials on the wear of the drill bit, in a context of said weighting of which:
each state of wear is likened to a divergence relative to a desired value of said criterion of quality of the corresponding drilling;
said divergence varies as a function of totalized values of said corresponding parameter having an effect on the wear of said drill bit according to a predetermined function;
wherein said processor is further configured to determine the at least one state of wear of said drill bit as a function of entry of said drill bit into the element to be drilled at each drilling of the element to be drilled comprising the at least one layer and the at least one material, the material of the element to be drilled with which the drill bit first comes into contact during a drilling act constituting an attack material, said processor is further configured to, for each state of wear:
take account of the following during the detection of the entry of said drill bit into a given element to be drilled:
the state of wear computed during detection of the entry of said drill bit into the element to be drilled of the previous drilling act,
a predetermined polynomial regression of the divergence between said criterion of quality, to which the state of wear corresponds, and a desired value as a function of totalized values of detection of the entry of said drill bit into the element to be drilled, said polynomial regression corresponding to said drill bit, to said attack material of said given element to be drilled
an inverse function of said polynomial regression,
compute a first value, resulting from said inverse function applied to said state of wear computed at the preceding drilling step;
compute a second value, which is a sum of the first value and of the new entry, compute the state of wear of the end of drilling of said given element to be drilled, resulting from said polynomial regression applied to the second value.

22. The device according to claim 21, wherein each state of wear is associated with a predetermined maximum threshold, said maximum threshold of each of said states of wear being lower than or equal to a state of predetermined maximum wear beyond which the criterion of quality of which said state of wear is characteristic is no longer met.

23. The device according to claim 22, wherein said processor is further configured to qualify said drill bit as:
- a "serviceable drill bit" that is serviceable so long as said maximum threshold of said at least one state of wear of said drill bit is not reached;
- an "out-of-service drill bit" that is out of service starting from the instant when the maximum threshold of at least one state of wear of said drill bit is reached.

24. The device according to claim 23, wherein said processor is further configured to send out a message indicating that the drill bit is out of service as soon as the "out-of-service" qualification is assigned to the drill bit.

* * * * *